United States Patent
Moon

(10) Patent No.: US 12,399,647 B2
(45) Date of Patent: Aug. 26, 2025

(54) STORAGE SYSTEM AND COMPUTING SYSTEM INCLUDING THE SAME

(71) Applicant: Samsung Electronics Co., Ltd., Suwon-si (KR)

(72) Inventor: Dongouk Moon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/952,633

(22) Filed: Sep. 26, 2022

(65) Prior Publication Data

US 2023/0221885 A1 Jul. 13, 2023

(30) Foreign Application Priority Data

Jan. 7, 2022 (KR) .................. 10-2022-0002654

(51) Int. Cl.
*G06F 3/06* (2006.01)

(52) U.S. Cl.
CPC ............ *G06F 3/0656* (2013.01); *G06F 3/064* (2013.01); *G06F 3/067* (2013.01); *G06F 3/0607* (2013.01)

(58) Field of Classification Search
CPC ........ G06F 3/0656; G06F 3/064; G06F 3/067; G06F 3/0607; G06F 3/061; G06F 3/0679; G06F 3/0688; G06F 3/0611; G06F 3/0631; G06F 3/0658; G06F 12/0292; G06F 2212/7201
See application file for complete search history.

(56) References Cited

U.S. PATENT DOCUMENTS

| | | | |
|---|---|---|---|
| 6,615,313 B2 | 9/2003 | Kato et al. | |
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,817,700 B2 | 11/2017 | Caufield et al. | |
| 10,459,639 B2 | 10/2019 | Koseki et al. | |
| 10,585,792 B2 | 3/2020 | Shin et al. | |
| 10,664,197 B2 | 5/2020 | Kanno | |
| 2009/0113085 A1* | 4/2009 | Banyai ................ | G06F 11/1441 710/53 |
| 2009/0132736 A1* | 5/2009 | Hasan ................. | G06F 13/4282 710/56 |
| 2011/0233648 A1 | 9/2011 | Seol et al. | |
| 2012/0215997 A1* | 8/2012 | Stanfill ................... | G06F 9/544 711/158 |
| 2013/0332504 A1* | 12/2013 | Nishioka ............. | H04L 41/0846 709/201 |

(Continued)

FOREIGN PATENT DOCUMENTS

JP 4067422 B2 3/2008

*Primary Examiner* — Nanci N Wong
(74) *Attorney, Agent, or Firm* — Harness, Dickey & Pierce, P.L.C.

(57) ABSTRACT

A storage system includes a first storage device including a first write buffer and a first nonvolatile memory device, and a second storage device including a second write buffer and a second nonvolatile memory device. The first storage device is configured to, in response to a determination that a use buffer size of the first write buffer is greater than a first reference buffer size when the first storage device receives write data from a host, transfer the write data to the second storage device, and the second storage device is configured to store the write data.

14 Claims, 18 Drawing Sheets

(56) References Cited

U.S. PATENT DOCUMENTS

| | | | |
|---|---|---|---|
| 2017/0070448 A1* | 3/2017 | Miller | H04L 67/10 |
| 2018/0081556 A1* | 3/2018 | Lee | G06F 3/0683 |
| 2018/0188952 A1* | 7/2018 | Carlton | G06F 3/0679 |
| 2021/0065768 A1* | 3/2021 | Palmer | G06F 12/1408 |
| 2021/0200470 A1* | 7/2021 | Chan | G06F 3/0653 |
| 2021/0281639 A1 | 9/2021 | Kachare et al. | |
| 2022/0012190 A1* | 1/2022 | Cheng | G06F 13/4282 |
| 2022/0066640 A1* | 3/2022 | Takeshita | G06F 3/0665 |
| 2022/0137835 A1* | 5/2022 | Malakapalli | G06F 9/30029 |
| | | | 714/6.22 |
| 2022/0188242 A1* | 6/2022 | Tanpairoj | G06F 12/0811 |
| 2023/0269626 A1* | 8/2023 | Wang | H04L 47/12 |
| | | | 370/329 |

\* cited by examiner

FIG. 4C

| | TOTAL BUFFER SIZE | REMAINING BUFFER SIZE | USE PERMISSION |
|---|---|---|---|
| RES2 | 4GB | 3GB | YES |
| ... | ... | ... | ... |
| RESN | 4GB | 1GB | NO |

| LOGICAL ADDRESS | PHYSICAL ADDRESS | LOCATION |
|---|---|---|
| 0x01 | 0x11 | SSD1 |
| 0x02 | 0x22 | SSD1 |
| ... | ... | ... |
| 0x10 | 0x99 | SSD2 |

STORAGE SYSTEM AND COMPUTING SYSTEM INCLUDING THE SAME

CROSS-REFERENCE TO RELATED APPLICATION

This application claims priority under 35 USC § 119 to Korean Patent Application No. 10-2022-0002654, filed on Jan. 7, 2022 in the Korean Intellectual Property Office (KIPO), the contents of which are herein incorporated by reference in their entirety.

BACKGROUND

1. Technical Field

Example embodiments relate generally to semiconductor integrated circuits, and more particularly to a storage system including a nonvolatile memory device, and a computing system including the storage system.

2. Description of the Related Art

A storage device including a nonvolatile memory device may perform a lazy write operation that first writes write data received from a host to a write buffer and then writes the write data stored in the write buffer to the nonvolatile memory device. Since a speed of a data write operation for the write buffer is faster than a speed of a data write operation for the nonvolatile memory device, the storage device may rapidly respond to a write command from the host by the lazy write operation.

SUMMARY

Some example embodiments of the present inventive concepts provides a storage system having improved write performance. Such a storage system may have improved performance based on being configured to provide a solution to an issue where all storage space of a write buffer of a storage device stores write data and/or where the write buffer has no free buffer wherein a data write operation that writes new write data to the write buffer cannot be performed until the write data stored in the write buffer are written to a nonvolatile memory device.

Some example embodiments of the present inventive concepts provides a computing system including a storage system having improved write performance.

According to some example embodiments, a storage system may include a first storage device including a first write buffer and a first nonvolatile memory device, and a second storage device including a second write buffer and a second nonvolatile memory device. The first storage device may be configured to, in response to a determination that a use buffer size of the first write buffer is greater than a first reference buffer size when the first storage device receives write data from a host, transfer the write data to the second storage device, and the second storage device may be configured to store the write data.

According to some example embodiments, a storage system includes a first storage device including a first write buffer, a mapping table and a first nonvolatile memory device, and a second storage device including a second write buffer and a second nonvolatile memory device. The first storage device may be configured to compare a use buffer size of the first write buffer with a first reference buffer size in response to a determination that the first storage device receives write data from a host. The first storage device may be configured to, in in response to a determination that the use buffer size of the first write buffer is greater than the first reference buffer size, transfer a buffer status request signal to the second storage device, and the second storage device is configured to transfer a buffer status response including a remaining buffer size of the second write buffer to the first storage device in response to the buffer status request signal. The first storage device may be configured to directly transfer the write data to the second storage device through P2P communication, the second storage device is configured to store the write data in the second write buffer, and the first storage device is configured to change a physical address for the write data in the mapping table to an address of the second storage device. The first storage device may be configured to, in response to a determination that the use buffer size of the first write buffer is decreased to less than a second reference buffer size, request the write data to the second storage device with the address of the second storage device, the second storage device is configured to directly transfer the write data to the first storage device through the P2P communication, the first storage device is configured to store the write data in the first write buffer, and the first storage device is configured to write the write data stored in the first write buffer to the first nonvolatile memory device.

According to some example embodiments, a computing system includes a storage system, and a host configured to store data in the storage system. The storage system includes a first storage device including a first write buffer and a first nonvolatile memory device, and a second storage device including a second write buffer and a second nonvolatile memory device. The first storage device may be configured to, in in response to a determination that a use buffer size of the first write buffer is greater than a first reference buffer size when the first storage device receives write data from the host, transfer the write data to the second storage device, and the second storage device is configured to store the write data.

In a storage system and a computing system according to some example embodiments, in example embodiments where a use buffer size of a first write buffer of a first storage device is greater than a reference buffer size when the first storage device receives write data from a host, the first storage device may transfer the write data to a second storage device, and the second storage device may store the write data. Accordingly, the first storage device may not wait until the first write buffer becomes empty, and may rapidly respond to a write command from the host, thereby improving a write speed and write performance of the storage system.

BRIEF DESCRIPTION OF THE DRAWINGS

Illustrative, non-limiting example embodiments will be more clearly understood from the following detailed description taken in conjunction with the accompanying drawings.

FIGS. 4A, 4B, and 4C are diagrams for describing an example where remaining buffer sizes of write buffers of other storage devices are checked according to some example embodiments.

DETAILED DESCRIPTION

Figure 1:
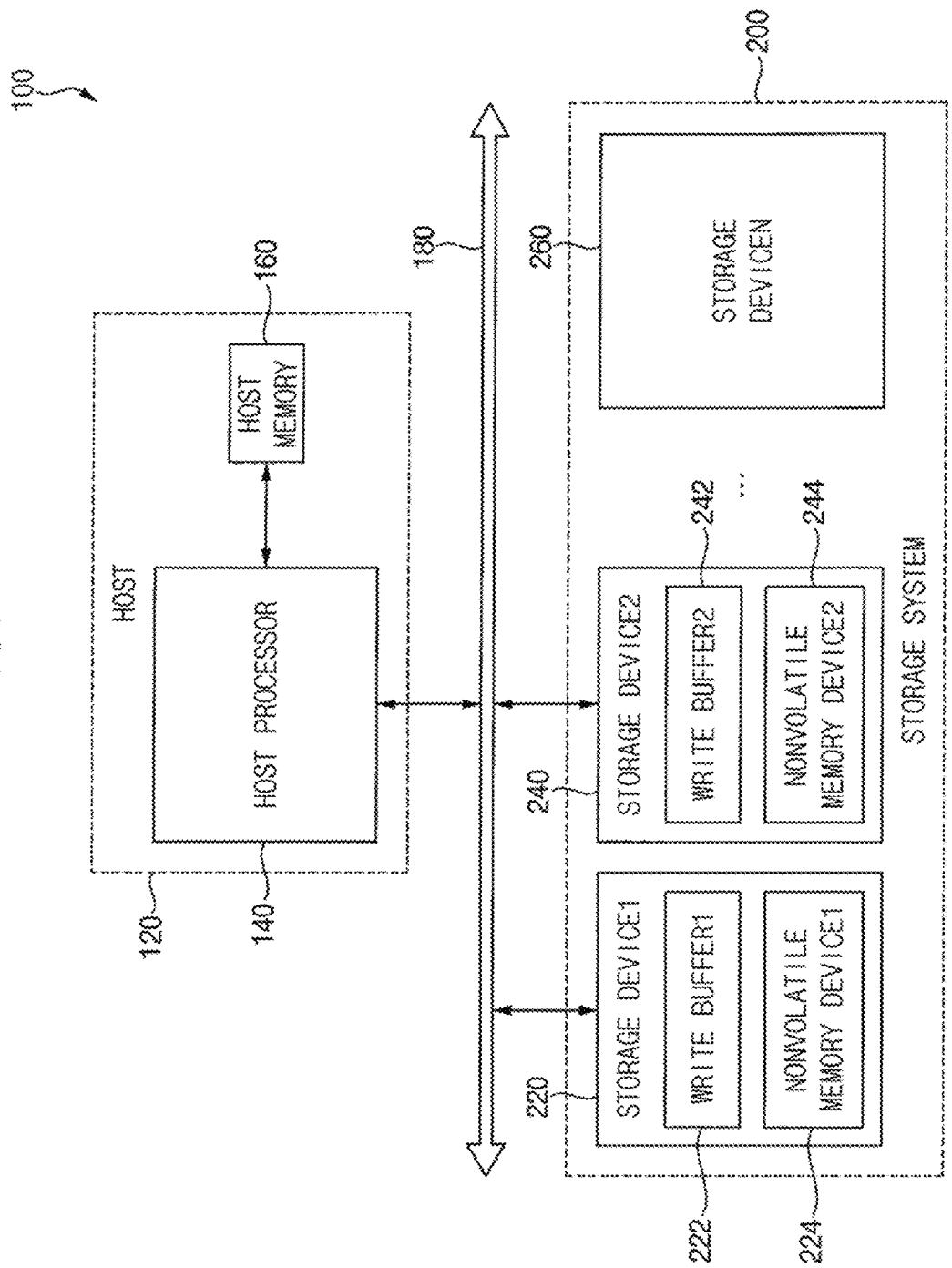
FIG. 1 is a block diagram illustrating a computing system including a storage system according to some example embodiments.

Various example embodiments will be described more fully with reference to the accompanying drawings, in which example embodiments are shown. The present inventive concepts may, however, be embodied in many different forms and should not be construed as limited to the example embodiments set forth herein. Like reference numerals refer to like elements throughout this application.

It will be understood that when an element such as a layer, film, region, or substrate is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed "by" performing additional operations, it will be understood that the operation may be performed "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.).

FIG. 1 is a block diagram illustrating a computing system including a storage system according to some example embodiments.

Referring to FIG. 1, a computing system 100 may include a storage system 200 including a plurality of storage devices 220, 240 and 260, and a host 120 storing data in the storage system 200.

In some example embodiments, the computing system 100 may be any computing system, such as a personal computer (PC), a server computer, a data center, a workstation, a digital television (TV), a set-top box, etc. In some example embodiments, the computing system 100 may be any mobile system, such as a mobile phone, a smart phone, a tablet computer, a laptop computer, a personal digital assistant (PDA), a portable multimedia player (PMP), a digital camera, a camcorder, a portable game console, a music player, a video player, a navigation device, a wearable device, an internet of things (IoT) device, an internet of everything (IoE) device, an e-book reader, a virtual reality (VR) device, an augmented reality (AR) device, a robotic device, a drone, etc.

The host 120 may include a host processor 140 and a host memory 160. The host processor 140 may transfer data stored in the host memory 160 as write data to the storage system 200, or may store read data read from the storage system 200 to the host memory 160.

In some example embodiments, the host processor 140 and the host memory 160 may be implemented as separate semiconductor chips. In some example embodiments, the host processor 140 and the host memory 160 may be integrated in the same semiconductor chip. As an example, the host processor 140 may be any one of a plurality of modules included in an application processor (AP). The AP may be implemented as a System on Chip (SoC). Further, the host memory 160 may be an embedded memory included in the AP, or a nonvolatile memory device (NVM) or a memory module located outside the AP.

The storage system 200 may be connected to the host 120 through an interface bus 180. In some example embodiments, the interface bus 180 may be, but not be limited to, a peripheral component interconnection express (PCIe) bus or a nonvolatile memory express (NVMe) bus. In some example embodiments, the interface bus 180 may be, but not be limited to, an advanced technology attachment (ATA) bus, a serial ATA (SATA) bus, an external SATA (e-SATA) bus, a small computer small interface (SCSI) bus, a serial attached SCSI (SAS) bus, a peripheral component interconnection (PCI) bus, an IEEE 1394 bus, a universal serial bus (USB), a secure digital (SD) card bus, a multi-media card (MMC) bus, a universal flash storage (UFS) bus, an embedded MMC (eMMC) bus, an embedded UFS (eUFS) bus, a compact flash (CF) card bus, or the like.

The storage system 200 may include N or more storage devices 220, 240 and 260, where N is an integer greater than 1. In some example embodiments, each storage device 220, 240 and 260 may be a solid state drive (SSD) device. For example, each storage device 220, 240 and 260 may be an SSD device that conforms to an NVMe standard. In some example embodiments, each storage device 220, 240 and 260 may be a UFS device, a MMC device or an eMMC device. In some example embodiments, each storage device 220, 240 and 260 may be an SD card, a micro SD card, a memory stick, a chip card, a USB card, a smart card, a CF card, or the like.

Each storage device 220, 240 and 260 may include a write buffer 222 and 242 and a nonvolatile memory device 224 and 244. For example, a first storage device 220 may include a first write buffer 222 and a first nonvolatile memory device 224, and a second storage device 240 may include a second write buffer 242 and a second nonvolatile memory device 244.

Each write buffer 222 and 242 may temporarily store data to be written to a corresponding nonvolatile memory device 224 and 244. For example, if a write command that requests writing of write data is received from the host 120 (e.g., in response to a determination that a write command that requests writing of write data is received from the host 120), the first storage device 220 may temporarily store the write data received from the host 120 in the first write buffer 222, and may write the write data stored in the first write buffer 222 to the first nonvolatile memory device 224. A speed of a data write operation for each write buffer 222 and 242 may be faster than a speed of a data write operation for each nonvolatile memory device 224 and 244, and thus each storage device 220, 240 and 260 may rapidly respond to the write command by using the write buffer 222 and 242.

Figure 13:
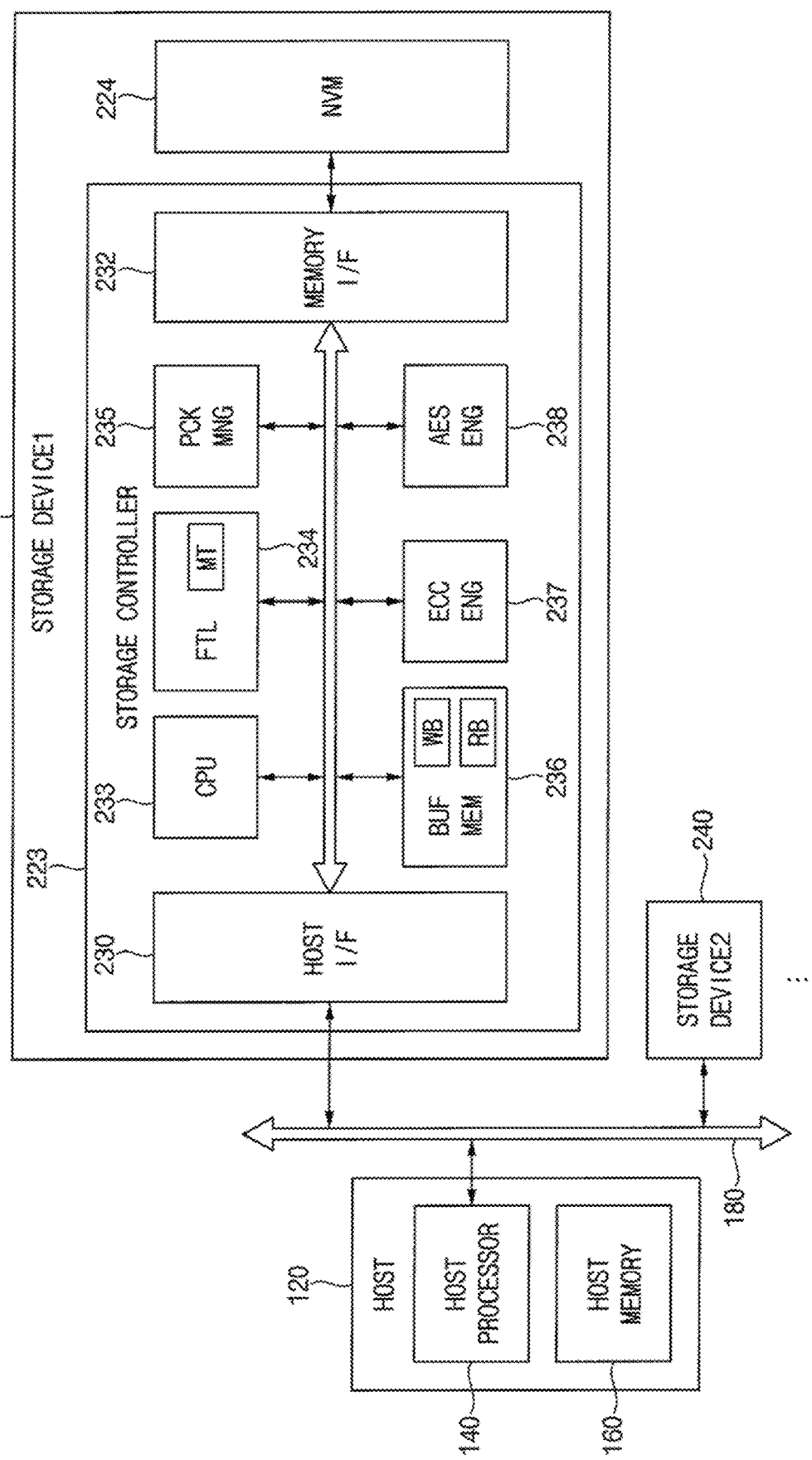
FIG. 13 is a block diagram illustrating a computing system according to some example embodiments.

In some example embodiments, as described below with reference to FIG. 13, each write buffer 222 and 242 may be included in a buffer memory. The buffer memory may include the write buffer 222 and 242 for temporarily storing the write data, a read buffer for temporarily storing read data, and an internal buffer for an internal operation within the storage device 220, 240 and 260. For example, a first buffer memory of the first storage device 220 may include the first write buffer 222, a first read buffer and a first internal buffer, and a second buffer memory of the second storage device 240 may include the second write buffer 242, a second read buffer and a second internal buffer. In some example embodiments, the buffer memory may be implemented with a volatile memory device, such as a dynamic random access memory (DRAM) or a static random access memory (SRAM). In some example embodiments, the buffer memory may be implemented with a nonvolatile memory device, such as a flash memory. For example, each nonvolatile memory device 224 and 244 may be implemented as a multi-level cell (MLC) memory, and the buffer memory may be implemented as a single level cell (SLC) memory faster than the MLC memory. Further, in some example embodiments, as illustrated in FIG. 13, the buffer memory may be located inside a storage controller of each storage device 220, 240 and 260. In some example embodiments, the buffer memory may be implemented with a separate semiconductor chip located outside the storage controller. In still some example embodiments, a partial region (e.g., an SLC region) of each nonvolatile memory device 224 and 244 may be used as the buffer memory.

Each nonvolatile memory device 224 and 244 may store the write data received through a corresponding write buffer 222 and 242 from the host 120. Further, data stored in each nonvolatile memory device 224 and 244 may be provided as read data through the read buffer to the host 120. In some example embodiments, each nonvolatile memory device 224 and 244 may be implemented with, but not limited to, a NAND flash memory. In some example embodiments, each nonvolatile memory device 224 and 244 may be implemented with an electrically erasable programmable read-only memory (EEPROM), a phase change random access memory (PRAM), a resistive random access memory (RRAM), a nano floating gate memory (NFGM), a polymer random access memory (PoRAM), a magnetic random access memory (MRAM), a ferroelectric random access memory (FRAM), or the like.

In the storage system 200 according to some example embodiments, each storage device (e.g., the first storage device 220) may use write buffers (e.g., the second write buffer 242) of other storage devices (e.g., the second storage device 240) when its write buffer (e.g., the first write buffer 222) is full or is used by more than a threshold. For example, if the first storage device 220 receives the write data from the host 120 (e.g., in response to a determination, for example by some portion of the storage system 200 such as the first storage device 220, that the first storage device 220 receives the write data from the host 120), the first storage device 220 may compare a use buffer size of the first write buffer 22 with a first reference buffer size. Here, each write buffer 222 and 242 may include a plurality of buffers, and the use buffer size may represent a size of buffers storing (effective) data among the plurality of buffers. The use buffer size may correspond to a value calculated by subtracting a size of free buffers from a total size of the plurality of buffers. Further, the first reference buffer size may be a maximum buffer size (or the total size of the plurality of buffers) of each write buffer 222 and 242, or may have a value less than the maximum buffer size. In example embodiments where the use buffer size of the first write buffer 222 is greater than the first reference buffer size, the first storage device may check remaining buffer sizes or free buffer sizes of the write buffers 242 of other storage device 240 and 260.

In some example embodiments, before (e.g., prior to) transferring the write data to one of the other storage devices 240 and/or 260, for example to the second storage device 240, to check the remaining buffer size of the second write buffer 242 of the second storage device 240, the first storage device 220 may transfer a buffer status request signal to the second storage device 240, and the second storage device 240 may transfer a buffer status response including the remaining buffer size of the second write buffer 242 to the first storage device 220 in response to the buffer status request signal. In example embodiments where the second write buffer 242 of the second storage device 240 has an available space, or free buffers, the first storage device 220 may transfer the write data to the second storage device 240.

In some example embodiments, the first storage device 220 may directly transfer the write data to the second storage device 240 through peer-to-peer (P2P) communication. In general, in example embodiments where data of the first storage device 220 are transferred to the second storage device 240, the data of the first storage device 220 may be stored through the host processor 140 in the host memory 160, and the data stored in the host memory 160 may be transferred through the host processor 140 to the second storage device 240. However, in the storage system 200 according to some example embodiments, the write data may be directly transferred from the first storage device 220 through the interface bus 180 to the second storage device 240 without participation of the host processor 140 or without being stored in the host memory 160. In some example embodiments, each storage device 220, 240 and 260 may be the SSD device that conforms to the NVMe standard, and the first storage device 220 may directly transfer the write data to the second storage device 240 through P2P communication using a controller memory buffer (CMB) and/or a persistent memory region (PMR). In some example embodiments, the first storage device 220 may directly transfer the write data to the second storage device 240 through P2P communication of a compute express link (CXL). In some example embodiments, the first storage device 220 may directly transfer the write data to the second storage device 240 through P2P communication of a cache coherent interconnect for accelerators (CCIX).

The second storage device 240 may store the write data transferred through the P2P communication in the second write buffer 242. In some example embodiments, the second storage device 240 may store the write data in the second write buffer 242 until the second storage device 240 transfers the write data to the first storage device 220. In some example embodiments, the second storage device 240 may write the write data stored in the second write buffer 242 to (a normal region of) the second nonvolatile memory device 244. In still some example embodiments, the second nonvolatile memory device 244 may include not only the normal region that is accessible by the host 120, but also an over-provisioning region that is not accessible by the host 120, and the second storage device 240 may write the write data stored in the second write buffer 242 to the over-provisioning region of the second nonvolatile memory device 244.

If (e.g., in response to a determination, for example by some portion of the storage system 200 such as the first storage device 220, that) the first storage device 220 receives a read command for the write data from the host 120, or if (e.g., in response to a determination, for example by some portion of the storage system 200 such as the first storage device 220, that) the use buffer size of the first write buffer 222 is decreased to less than a second reference buffer size, the first storage device 220 may receive the write data from the second storage device 240.

For example, in example embodiments where the first storage device 220 receives the read command for the write data from the host 120 while the write data are stored (e.g., concurrently with the write data being stored) in the second storage device 240, the first storage device 220 may request the write data to the second storage device 240 (e.g., transmit a request to the second storage device 240 to transmit the write data to the first storage device 220 such that the first storage device 220 receives the write data from the second storage device 240) through the P2P communication (e.g., of CMR/PMR, CXL or CCIX), and the second storage device 240 may directly transfer the write data to the first storage device 220 through the P2P communication (e.g., of CMR/PMR, CXL or CCIX). The first storage device 220 may store the write data transferred through the P2P communication in the first read buffer, and may output the write data stored in the first read buffer to the host 120.

Further, for example, in example embodiments where (e.g., in response to a determination, for example by some portion of the storage system 200 such as the first storage device 220, that) the use buffer size of the first write buffer 222 is decreased to less than the second reference buffer size, and/or the first storage device 220 is in an idle state (e.g., the first storage device 220 has little or no command to be processed), the first storage device 220 may request the write data to the second storage device 240 (e.g., transmit a request to the second storage device 240 to transmit the write data to the first storage device 220 such that the first storage device 220 receives the write data from the second storage device 240) through the P2P communication. In some example embodiments, the second reference buffer size may be less than or equal to the first reference buffer size. The second storage device 240 may directly transfer the write data to the first storage device 220 through the P2P communication. The first storage device 220 may store the write data transferred through the P2P communication in the first write buffer 222, and may write the write data stored in the first write buffer 222 to the first nonvolatile memory device 224.

In a conventional storage system, in example embodiments where a write buffer of each storage device is full or is used by more than a threshold, a data write operation that writes new write data to the write buffer cannot be performed until write data stored in the write buffer are written to a nonvolatile memory device. However, in the storage system 200 and the computing system 100 including the storage system 200 according to some example embodiments, even if the first write buffer 222 is full or is used by more than a threshold, the first storage device 220 may transfer the write data received from the host 120 to the second storage device 240, and the second storage device 240 may store the write data. Accordingly, the first storage device 220 may not wait until the first write buffer 222 becomes empty, and may rapidly respond to the write command from the host 120, thereby improving a write speed and write performance of the storage system 200 and thereby improving the functionality of the storage system 200 and any device, system, or the like that includes the storage system 200 (e.g., the computing system 100 shown in FIG. 1).

Figure 2:
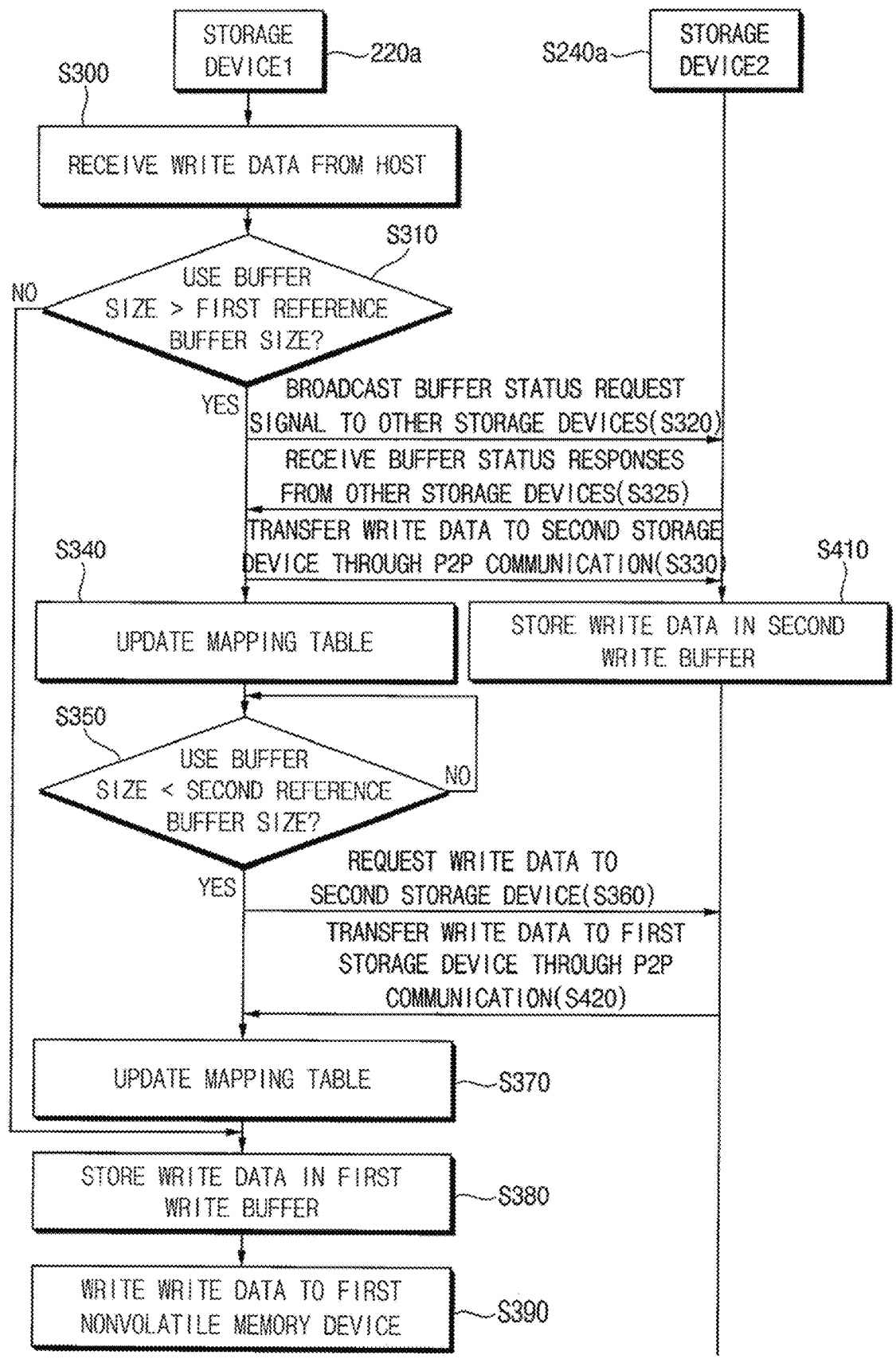
FIG. 2 is a flowchart for describing an example of an operation of a storage system according to some example embodiments.
Figure 3:
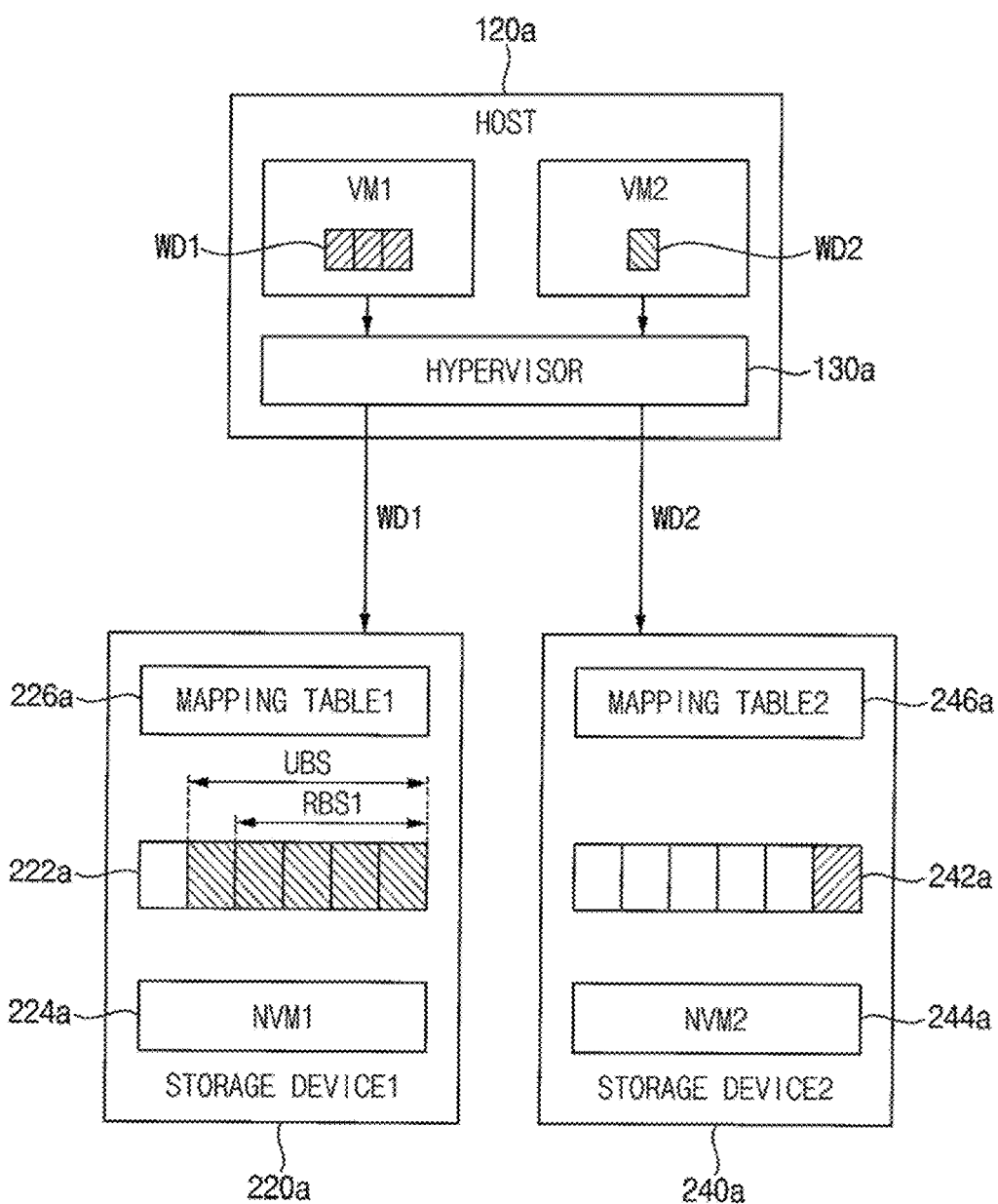
FIG. 3 is a diagram for describing an example where a use buffer size of a first write buffer is greater than a first reference buffer size according to some example embodiments.
Figure 4A:
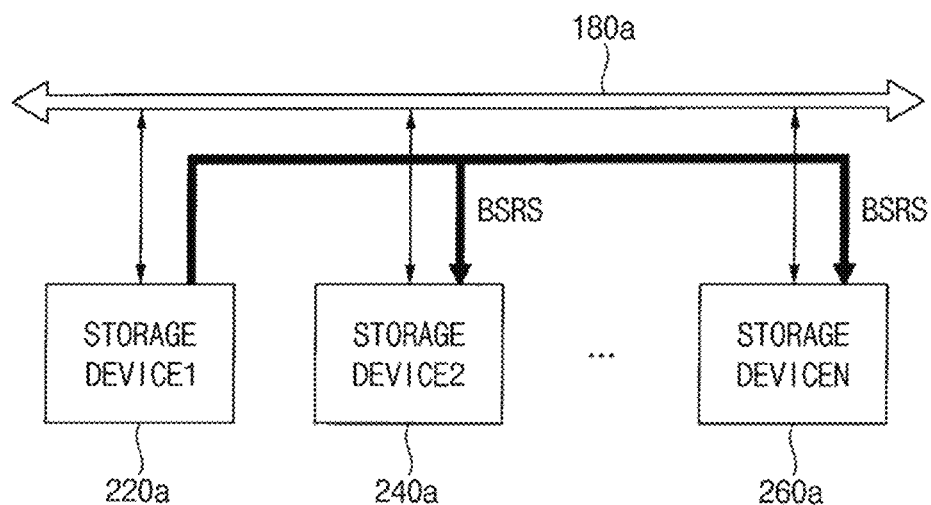
Figure 4B:
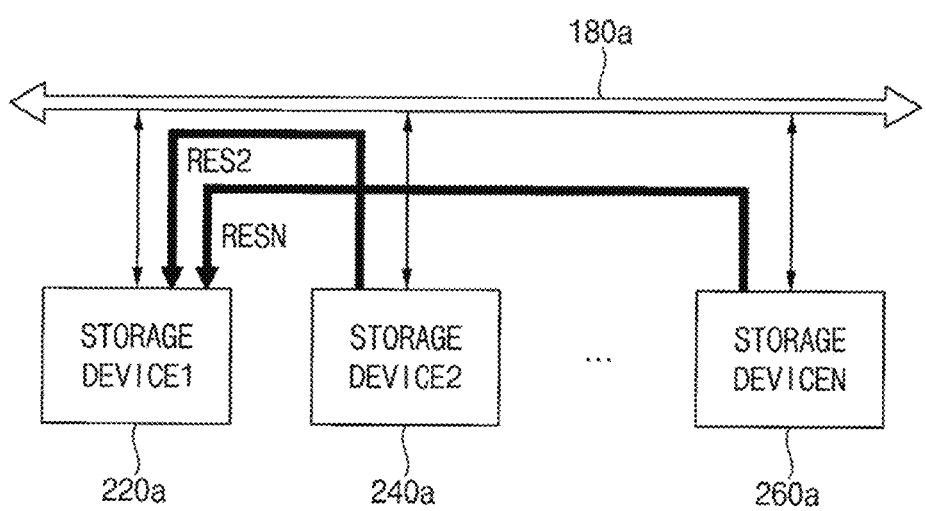
Figure 5:
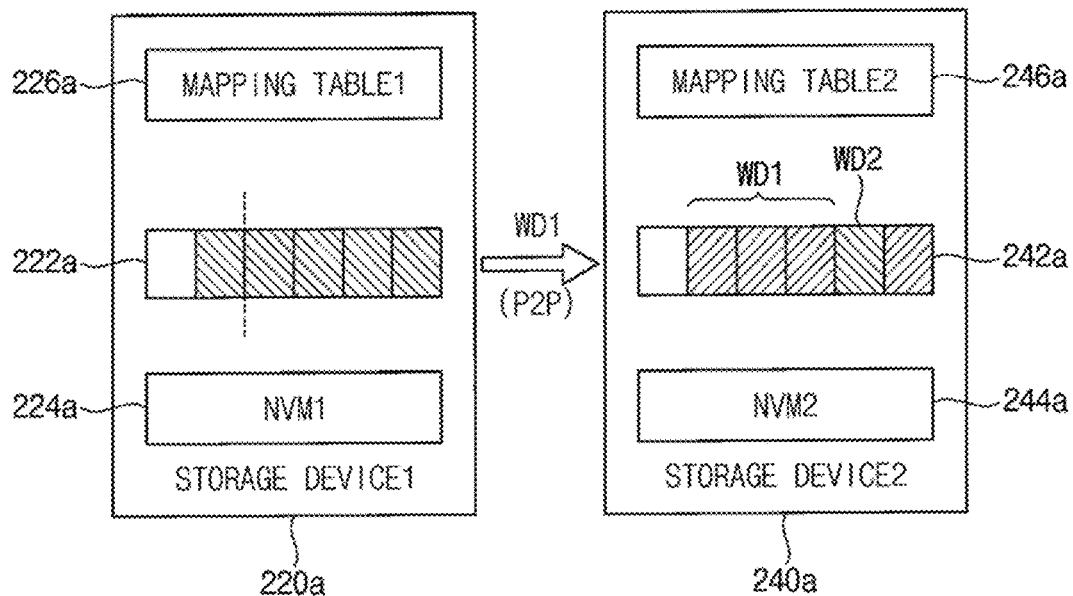
FIG. 5 is a diagram for describing an example where a first storage device transfers write data to a second storage device according to some example embodiments.
Figure 6:
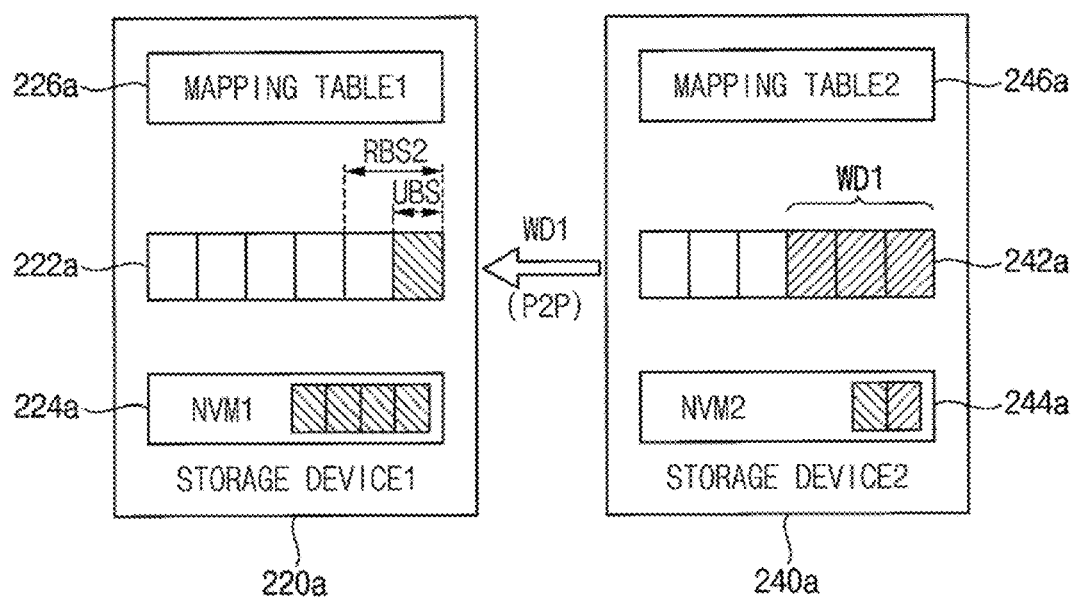
FIG. 6 is a diagram for describing an example where a first storage device receives write data that are temporarily stored in a second storage device according to some example embodiments.

FIG. 2 is a flowchart for describing an example of an operation of a storage system according to some example embodiments, FIG. 3 is a diagram for describing an example where a use buffer size of a first write buffer is greater than a first reference buffer size according to some example embodiments, FIGS. 4A, 4B, and 4C are diagrams for describing an example where remaining buffer sizes of write buffers of other storage devices are checked according to some example embodiments, FIG. 5 is a diagram for describing an example where a first storage device transfers write data to a second storage device according to some example embodiments, and FIG. 6 is a diagram for describing an example where a first storage device receives write data that are temporarily stored in a second storage device according to some example embodiments.

Referring to FIGS. 2 and 3, when (e.g., in response to a determination, for example by some portion of the storage system 200 such as the first storage device 220, that) a first storage device 220a receives first write data WD1 from a host 120a (step S300), the first storage device 220a may compare a use buffer size UBS of a first write buffer 222a with a first reference buffer size RBS1 (step S310). For example, the host 120a may execute a first virtual machine VM1 and a second virtual machine VM2, and may further execute a hypervisor 130a that operates or controls the first and second virtual machines VM1 and VM2. In an example of FIG. 3, the first storage device 220a may be allocated to the first virtual machine VM1, and a second storage device 240a may be allocated to the second virtual machine VM2. In example embodiments, the first virtual machine VM1 may transfer or write the first write data WD1 to the first storage device 220a directly or through the hypervisor 130a, and the second virtual machine VM2 may transfer or write second write data WD2 to the second storage device 240a directly or through the hypervisor 130a. In some example embodiments, the comparing at step S310 is performed in response to a start of receiving the first write data WD1 from the host at step S300. In some example embodiments, the comparing at step S310 is performed at least partially concurrently with the first write data WD1 being received at step S300.

In example embodiments where (e.g., in response to a determination, for example by some portion of the storage system 200 such as the first storage device 220a, that) the use buffer size UBS of the first write buffer 222a is less than or equal to the first reference buffer size RBS1 (step S310: NO), the first storage device 220a may store the first write data WD1 in the first write buffer 222a (step S380), may check a first physical address corresponding to a first logical address for the first write data WD1 in a first mapping table 226a, and may write the first write data WD1 stored in the first write buffer 222a to a first memory block having the first physical address within a first nonvolatile memory device (hereinafter, "NVM1") 224a (step S390). As described below with reference to FIG. 13, each storage device 220a and 240a may include a mapping table 226a and 246a that stores physical addresses of a corresponding nonvolatile memory device 224a and 244a corresponding to logical addresses received from the host 120a. Further, in example embodiments where (e.g., in response to a determination, for example by some portion of the storage system 200 such as the second storage device 240a, that) a use buffer size of a second write buffer 242a is less than or equal to the first reference buffer size RBS1, the second storage device 240a may store the second write data WD2 in the second write buffer 242a, may check a second physical address corresponding to a second logical address for the second write data WD2 in a second mapping table 246a, and may write the second write data WD2 stored in the second write buffer 242a to a second memory block having the second physical address within a second nonvolatile memory device (hereinafter, "NVM2") 244a.

In some example embodiments, in example embodiments where (e.g., in response to a determination, for example by some portion of the storage system 200 such as the first storage device 220a, that) the use buffer size UBS of the first write buffer 222a is greater than the first reference buffer size RBS1 (step S310: YES) (for example, a determination at step S310 that the use buffer size UBS of the first write buffer 222a is greater than the first reference buffer size RBS1, where such determination at step S310 may be performed in response to the first storage device 220a receiving the write data from WD1 from the host 120a at step S300), the first write buffer 222a may check remaining buffer sizes of write buffers 242a of other storage devices 240a (step S320 and step S325). In some example embodiments, as illustrated in FIG. 4A, the first storage device 220a may broadcast a buffer status request signal BSRS to other storage devices 240a and 260a through an interface bus 180a (step S320). As illustrated in FIG. 4B, the other storage devices 240a and 260a may transfer buffer status responses RES2 and RESN including the remaining buffer sizes of their write buffers 242a through the interface bus 180a in response to the buffer status request signal BSRS, respectively (step S325). For example, as illustrated in FIG. 4C, the buffer status response RES2 of the second storage device 240a may include a total buffer size of the second write buffer 242a (e.g., may include information indicating a total buffer size of the second write buffer 242a), the remaining buffer size of the second write buffer 242a, and information about (e.g., information indicating) whether the second write buffer 242a is permitted to be used by another storage, or the first storage device 220a. FIG. 4C illustrates an example where an N-th storage device 260a does not permit the first storage device 220a to use its write buffer, but the second storage device 240a permits the first storage device 220a to use the second write buffer 242a. The first storage device 220a may select a storage device to which the first write data WD1 are to be transferred from the other storage devices 240a and 260a based on the buffer status responses RES2 and RESN. In some example embodiments, the first storage device 220a may select, but not limited to, a storage device having the largest remaining buffer size. Further, in some example embodiments, where the other storage devices 240a and 260a are incompatible with the first storage device 220a, the other storage devices 240a and 260a may not respond to the buffer status request signal BSRS.

In example embodiments where the second storage device 240a is selected based on the buffer status responses RES2 and RESN, as illustrated in FIG. 5, the first storage device 220a may directly transfer the first write data WD1 to the second storage device 240a through P2P communication without participation of the host 120a (step S330). Accordingly, the first storage device 220a may not wait until the first write buffer 222a becomes empty, and may rapidly respond to the write command from the host 120, thereby improving a write speed and write performance of the storage system 200 and thereby improving the functionality of the storage system 200 and any device, system, or the like that includes the storage system 200 (e.g., the computing system 100 shown in FIG. 1). If the first write data WD1 are received through the P2P communication, the second storage device 240a may store not only the second write data WD2 in the second write buffer 242a, but also the first write data WD1 received through the P2P communication in the second write buffer 242a (step S410). In some example embodiments, the second write data WD2 stored in the second write buffer 242a may be written to the NVM2 244a, but the second write buffer 242a may store the first write data WD1 until the first write data WD1 are transferred or returned to the first storage device 220a. If the first write data WD1 are stored in the second storage device 240a, the first storage device 220a may change or update the first physical address corresponding to the first logical address for the first write data WD1 in the first mapping table 226a from an original physical address (e.g., an address of a memory block within the NVM1 224a) to an address of the second storage device 240a (step S340). For example, if the second storage device 240a stores the first write data WD1 in the second write buffer 242a, the second storage device 240a may transfer a success response including a logical address within the second storage device 240a to the first storage device 220a, and the first storage device 220a may change or update the first physical address for the first write data WD1 in the first mapping table 226a to the logical address received from the second storage device 240a.

In example embodiments where (e.g., in response to a determination, for example by some portion of the storage system 200 such as the first storage device 220a, that) the use buffer size UBS of the first write buffer 222a is greater than or equal to a second reference buffer size (step S350: NO), the first write data WD1 may be retained in the second storage device 240a. In example embodiments where (e.g., in response to a determination, for example by some portion of the storage system 200 such as the first storage device 220a, that) the first storage device 220a receives a read command for the first write data WD1 from the host 120a while the first write data WD1 are stored (e.g., concurrently with the first write data WD1 being stored) in the second storage device 240a, the first storage device 220a may receive the first write data WD1 from the second storage device 240a, may store the first write data WD1 in a first read buffer of the first storage device 220a, may output the first write data WD1 stored in the first read buffer to the host 120a.

In some example embodiments, as illustrated in FIG. 6, in example embodiments where (e.g., in response to a determination, for example by some portion of the storage system 200 such as the first storage device 220a, that) the use buffer size UBS of the first write buffer 222a is decreased to less than the second reference buffer size RBS2 (step S350: YES), and/or the first storage device 220a is in an idle state, the first storage device 220a may receive the first write data WD1 from the second storage device 240a (step S360 and step S420). In some example embodiments, the first storage device 220a may request the first write data WD1 to the second storage device 240a based on the address of the second storage device 240a for the first write data WD1 in the first mapping table 226a (step S360). The second storage device 240a may directly transfer the first write data WD1 stored in the second write buffer 242a to the first storage device 220a through the P2P communication without participation of the host 120a (step S420).

If (e.g., in response to a determination, for example by some portion of the storage system 200 such as the first storage device 220a, that) the first write data WD1 are received or returned through the P2P communication, the first storage device 220a may change or update the first physical address corresponding to the first logical address for the first write data WD1 in the first mapping table 226a from the address of the second storage device 240a to the original physical address, or the address of the memory block within the NVM1 224a (step S370). Further, the first storage device 220a may store the first write data WD1 received through the P2P communication in the first write buffer 222a (step S380), and may write the first write data WD1 to the memory block within the NVM1 224a based on the first physical address for the first write data WD1 in the first mapping table 226a (step S390).

Figure 7A:
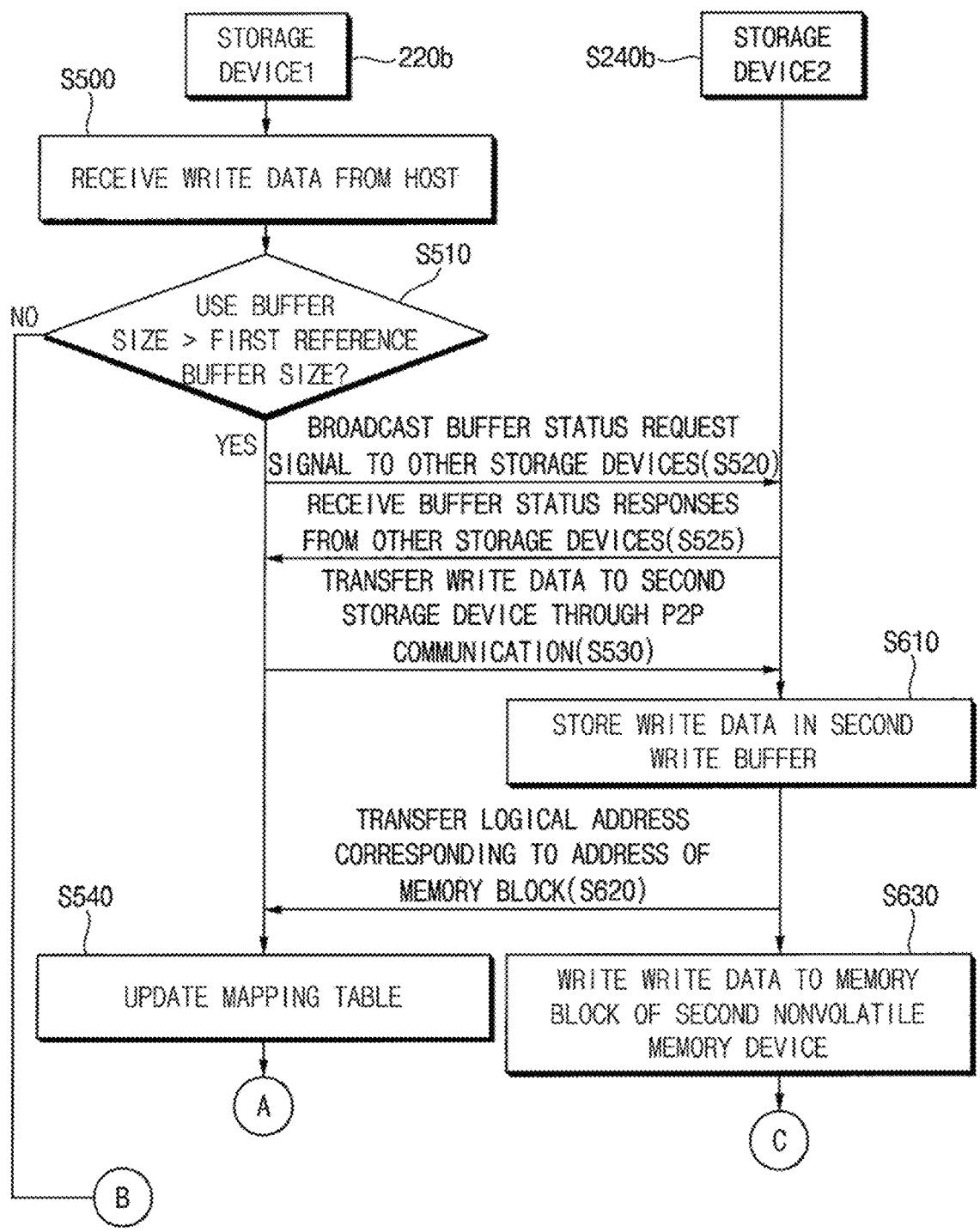
FIGS. 7A and 7B are separate portions of a flowchart for describing an example of an operation of a storage system according to some example embodiments.
Figure 7B:
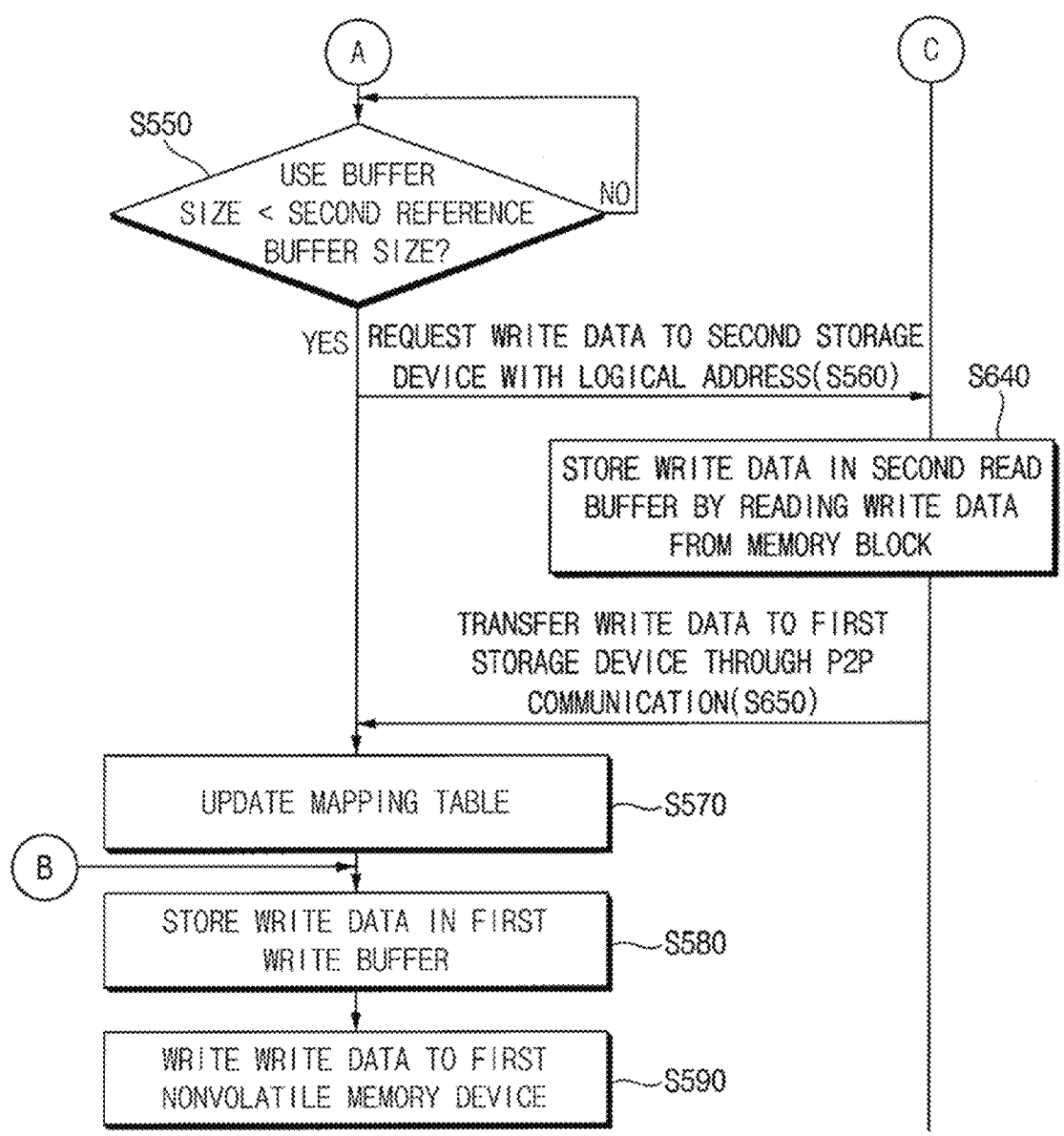
Figures 8, 9:
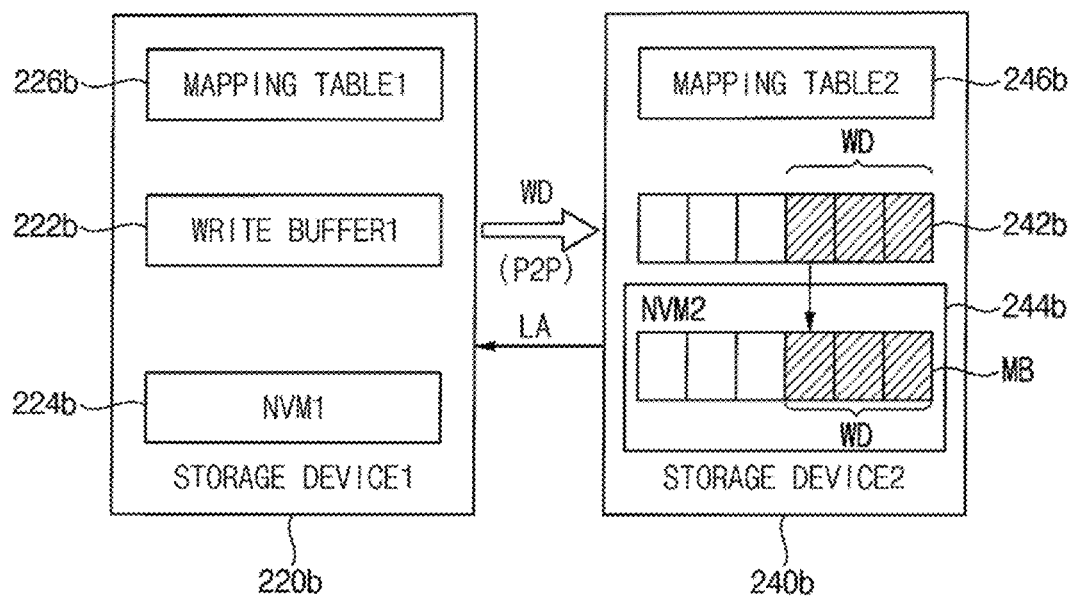
FIG. 8 is a diagram for describing an example where a second storage device temporarily stores write data in a second nonvolatile memory device according to some example embodiments.
FIG. 9 is a diagram illustrating an example of a first mapping table of a first storage device according to some example embodiments.
Figure 10:
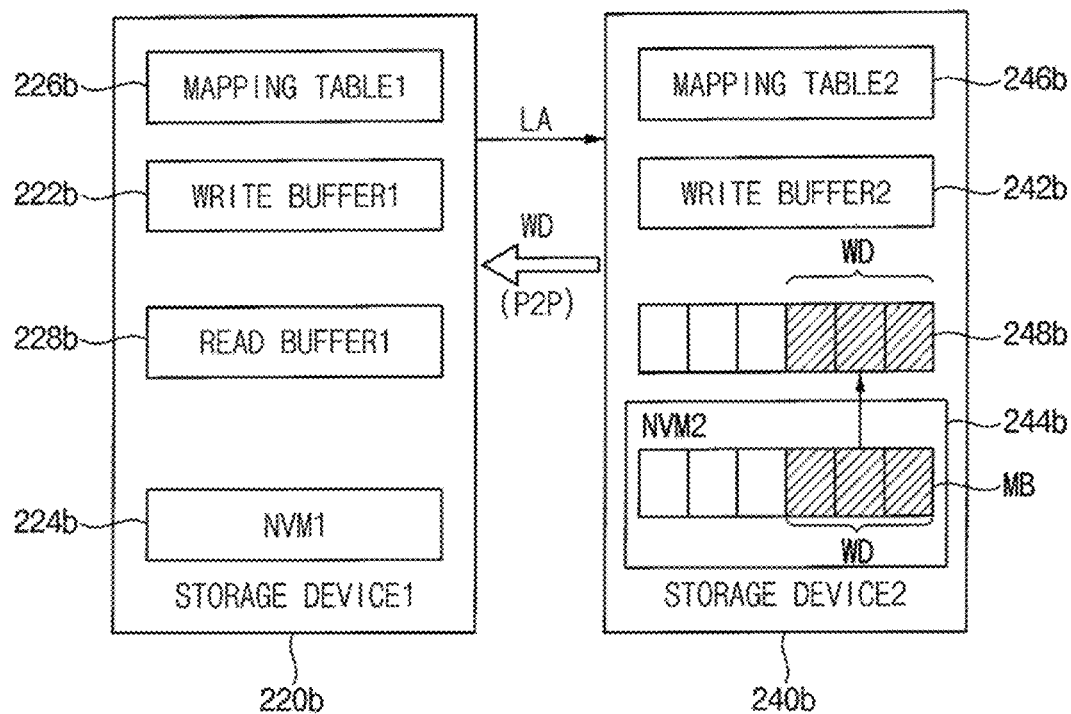
FIG. 10 is a diagram for describing an example where a first storage device receives write data that are temporarily stored in a second nonvolatile memory device of a second storage device according to some example embodiments.

FIGS. 7A and 7B are separate portions of a flowchart for describing an example of an operation of a storage system according to some example embodiments, FIG. 8 is a diagram for describing an example where a second storage device temporarily stores write data in a second nonvolatile memory device system according to some example embodiments, FIG. 9 is a diagram illustrating an example of a first mapping table of a first storage device system according to some example embodiments, and FIG. 10 is a diagram for describing an example where a first storage device receives write data that are temporarily stored in a second nonvolatile memory device of a second storage device system according to some example embodiments.

An operation of a storage system illustrated in FIGS. 7A and 7B may be similar to an operation of a storage system illustrated in FIG. 2, except that a second storage device 240b may store write data WD received through P2P communication from a first storage device 220b in an NVM2 244b.

Referring to FIGS. 7A, 7B and 8, when (e.g., in response to a determination, for example by some portion of the storage system 200 such as the first storage device 220b, that) the first storage device 220b receives the write data WD from a host (step S500), the first storage device 220b may compare a use buffer size of a first write buffer 222b with a first reference buffer size (step S510). In some example embodiments, the comparing at step S510 is performed in response to a start of receiving the write data WD from the host at step S500. In some example embodiments, the comparing at step S510 is performed at least partially concurrently with the write data WD being received at step S500. In example embodiments where (e.g., in response to a determination, for example by some portion of the storage system 200 such as the first storage device 220b, that) the use buffer size of the first write buffer 222b is less than or equal to the first reference buffer size (step S510: NO), where such determination at step S510 may be made when (e.g., in response to) the first storage device 220b receives the write data WD from the host at step S500, the first storage device 220b may store the write data WD in the first write buffer 222b (step S580), and may write the write data WD1 stored in the first write buffer 222b to an NVM1 224b (step S590). In some example embodiments, in example embodiments where the use buffer size of the first write buffer 222b is greater than the first reference buffer size (step S510: YES), where such determination at step S510 may be made when (e.g., in response to) the first storage device 220b receives the write data WD from the host at step S500, the first storage device 220b may broadcast a buffer status request signal to other storage devices 240b (step S520), and may receive buffer status responses including remaining buffer sizes of their write buffers 242b from the other storage devices 240b (step S525).

In example embodiments where the second storage device 240b is selected based on the buffer status responses, as illustrated in FIG. 8, the first storage device 220b may directly transfer the write data WD to the second storage device 240b through P2P communication without participation of the host (step S530). Accordingly, the first storage device 220b may not wait until the first write buffer 222b becomes empty, and may rapidly respond to the write command from the host, thereby improving a write speed and write performance of the storage system 200 and thereby improving the functionality of the storage system 200 and any device, system, or the like that includes the storage system 200 (e.g., the computing system 100 shown in FIG. 1). If the write data WD are received through the P2P communication, the second storage device 240b may store the write data WD in a second write buffer 242b (step S610), and then may write the write data WD stored in the second write buffer 242b to a memory block MB of the NVM2 244b (step S630).

Further, if the write data WD are stored in the second write buffer 242b (step S610), the second storage device 240b may check a logical address LA corresponding to an address (e.g., a physical address) of the memory block MB in a second mapping table 246b, and may transfer the logical address LA to the first storage device 220b (step S620). The first storage device 220b may change a physical address for the write data WD in a first mapping table 226b from an address of a memory block of the NVM1 224b to the logical address LA received from the second storage device 240b.

For example, as illustrated in FIG. 9, the first mapping table 226b may store a plurality of logical addresses (e.g., logical block addresses) and a plurality of physical address (e.g., physical block addresses) corresponding to the logical addresses, and may further store location information representing (e.g., indicating) which one of a plurality of storage devices 220b and/or 240b store data corresponding to each pair of the logical and physical address. In an example of FIG. 9, SSD1 may represent the first storage device 220b, and SSD2 may represent the second storage device 240b. Further, FIG. 9 illustrates an example where the write data WD having a logical address of '0x10' are stored in the second storage device 240b. If the write data WD are stored in the second storage device 240b, the first storage device 220b may change a physical address corresponding to the logical address of '0x10' to the logical address LA of '0x99' within the second storage device 240b.

In example embodiments where the use buffer size of the first write buffer 222b is greater than or equal to a second reference buffer size (step S550: NO), the write data WD may be retained in the memory block MB of the NVM2 244b of the second storage device 240b. In example embodiments where the use buffer size of the first write buffer 222b is decreased to less than the second reference buffer size (step S550: YES), as illustrated in FIG. 10, the first storage device 220b may receive the write data WD from the second storage device 240b (step S560, step S640 and step S650). In some example embodiments, the first storage device 220b may request the write data WD to the second storage device 240b with the logical address LA of the second storage device 240b stored in the first mapping table 226b (step S560). The second storage device 240b may store the write data WD in a second read buffer 248b by reading the write data WD from the memory block MB of the NVM2 244b based on the address of the memory block MB of the NVM2

244b corresponding to the logical address LA (step S640), and may transfer the write data WD stored in the second read buffer 248b to the first storage device 220b through the P2P communication (step S650).

The first storage device 220b may change, update or recover the physical address for the write data WD in the first mapping table 226b to the address of the memory block of the NVM1 224b (step S570), may store the write data WD received through the P2P communication in the first write buffer 222b (step S580), and may write the write data WD to the memory block of the NVM1 224b (step S590). Thereafter, if the host transfers a read command that requests the write data WD, the first storage device 220b may store the write data WD in a first read buffer 228b by reading the write data WD from the memory block of the NVM1 224b, and may provide the write data WD stored in the first read buffer 228b as read data to the host.

Figure 11A:
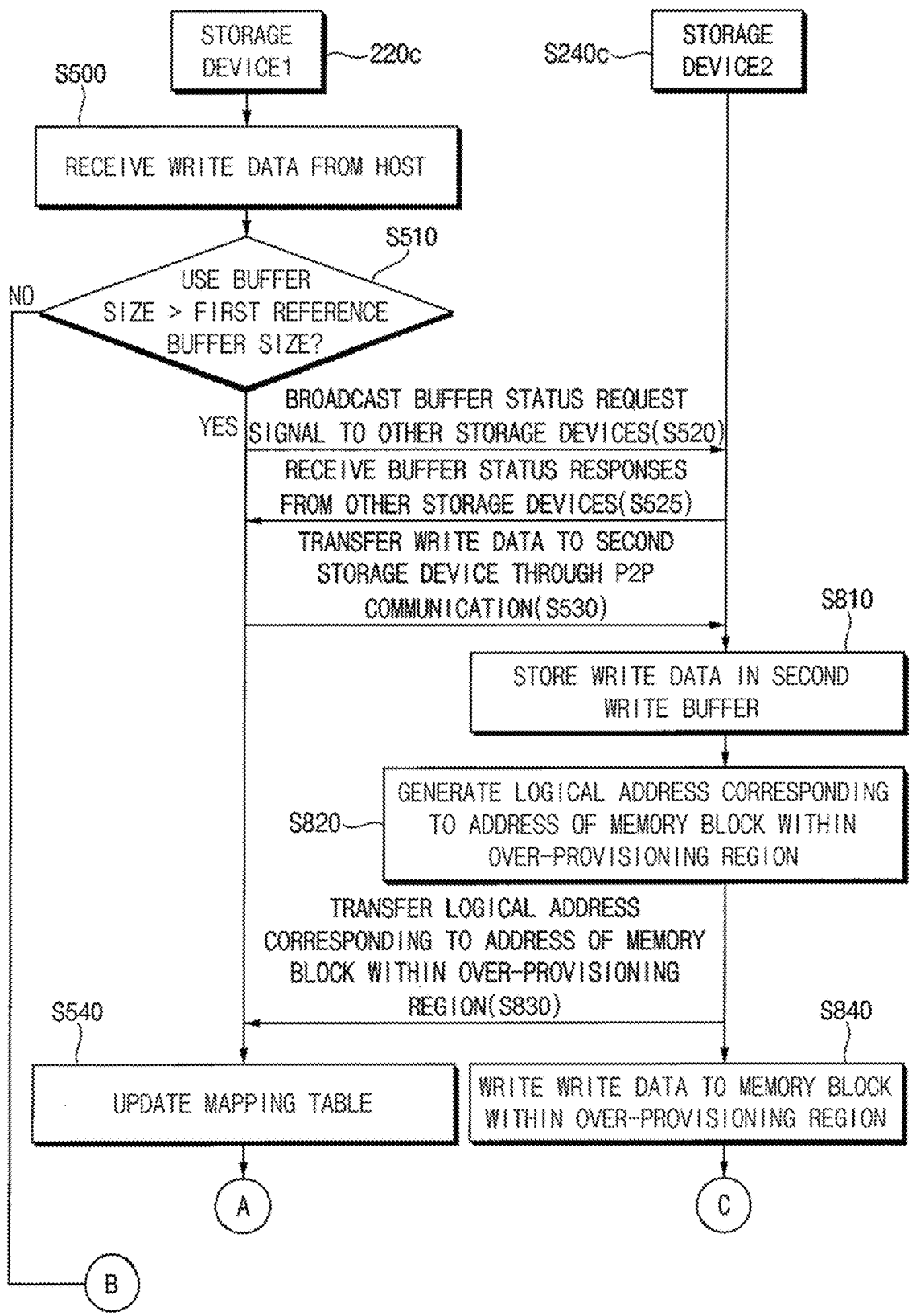
FIGS. 11A and 11B are separate portions of a flowchart for describing an example of an operation of a storage system according to some example embodiments.
Figure 11B:
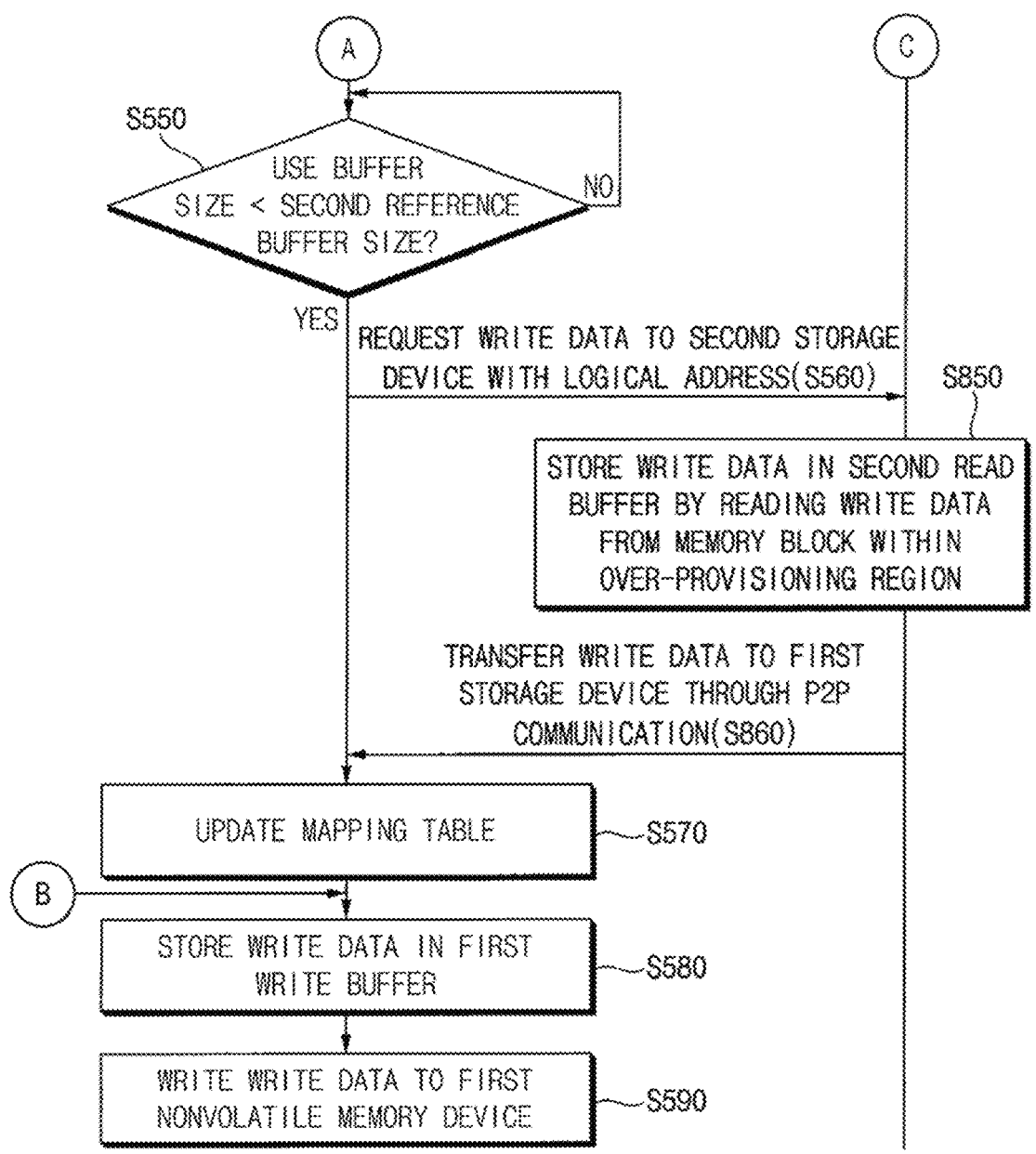
Figure 12:
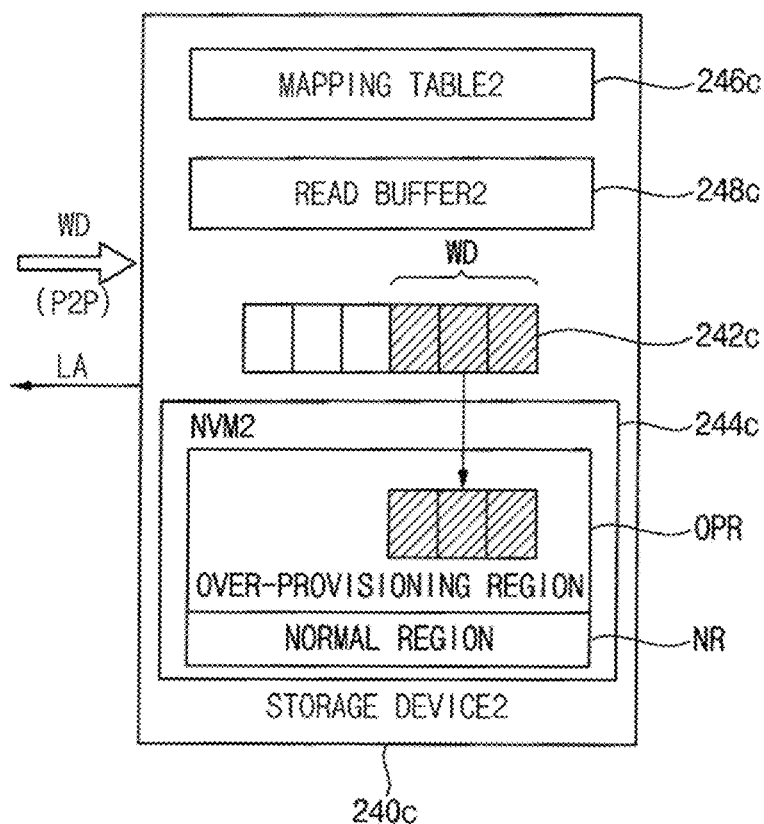
FIG. 12 is a diagram for describing an example where a second storage device temporarily stores write data in an over-provisioning region of a second nonvolatile memory device according to some example embodiments.

FIGS. 11A and 11B are separate portions of a flowchart for describing an example of an operation of a storage system according to some example embodiments, and FIG. 12 is a diagram for describing an example where a second storage device temporarily stores write data in an over-provisioning region of a second nonvolatile memory device according to some example embodiments.

An operation of a storage system illustrated in FIGS. 11A and 11B may be similar to an operation of a storage system illustrated in FIGS. 7A and 7B, except that a second storage device 240c may store write data WD received through P2P communication from a first storage device 220c in an over-provisioning region OPR of an NVM2 244c.

Referring to FIGS. 11A, 11B and 12, each nonvolatile memory device 244c may include a normal region NR that is accessible by a host, and an over-provisioning region OPR that is not accessible by the host. For example, a mapping table 246c may store a logical address corresponding to a physical address of a memory block within the normal region NR, but not store a logical address corresponding to a physical address of a memory block within the over-provisioning region OPR. Thus, each nonvolatile memory device 244c may not provide the logical address for the over-provisioning region OPR to the host, and the host may not be able to access the over-provisioning region OPR. In some example embodiments, the over-provisioning region OPR may be a region for an internal operation (e.g., a wear-leveling operation, a garbage collection operation, or the like) of each storage device 220c and 240c.

If the second storage device 240c receives the write data WD through the P2P communication from the first storage device 220c (step S530), the second storage device 240c may store the write data WD in a second write buffer 242c (step S810), and then may write the write data WD stored in the second write buffer 242c to a memory block within the over-provisioning region OPR of the NVM2 244c (step S840). Further, the second storage device 240c may generate a logical address LA corresponding to an address of the memory block within the over-provisioning region OPR in a second mapping table 246c (step S820), and may transfer the logical address LA to the first storage device 220c (step S830). The first storage device 220c may change or update a physical address for the write data WD in a first mapping table to the logical address LA received from the second storage device 240c (step S540).

Thereafter, the first storage device 220c may request the write data WD to the second storage device 240c with the logical address LA (step S560). The second storage device 240c may store the write data WD in a second read buffer 248c by reading the write data WD from the memory block within the over-provisioning region OPR based on the address of the memory block within the over-provisioning region OPR corresponding to the logical address LA in the second mapping table 246c (step S850), and may transfer the write data WD stored in the second read buffer 248c to the first storage device 220c through the P2P communication (step S860).

FIG. 13 is a block diagram illustrating a computing system according to some example embodiments.

Referring to FIG. 13, a computing system may include a storage system 200 including a plurality of storage devices 220, 240, . . . , and a host 120 storing data in the storage system 200. The host 120 may include a host processor 140 and a host memory 160. Each storage device 220 may include a storage controller 223 and a nonvolatile memory device (hereinafter, "NVM") 224. In some example embodiments, the NVM 224 may include a flash memory, and the flash memory may include a 2D NAND memory array or a 3D (or vertical) NAND (VNAND) memory array. In some example embodiments, the NVM 224 may include various other kinds of NVMs, such as, an MRAM, a spin-transfer torque MRAM, a conductive bridging RAM (CBRAM), an FRAM, PRAM, RRAM, and various other kinds of memories.

The storage controller 223 may include a host interface 230, a memory interface 232, a central processing unit (CPU) 233 and a buffer memory 236. The storage controller 223 may further include a flash translation layer (FTL) 234, a packet manager 235, an error correction code (ECC) engine 237 and an advanced encryption standard (AES) engine 238. The storage controller 223 may further include a working memory (not shown) in which the FTL 234 is loaded, and the CPU 233 may execute the FTL 234 to control data write and read operations on the NVM 224.

The host interface 230 may transmit and receive packets to and from the host 120. A packet transmitted from the host 120 to the host interface 230 may include a command or data to be written to the NVM 224. A packet transmitted from the host interface 230 to the host 120 may include a response to the command or data read from the NVM 224. The memory interface 232 may transmit data to be written to the NVM 224 to the NVM 224, or may receive data read from the NVM 224. The memory interface 232 may be configured to comply with a standard protocol, such as Toggle or open NAND flash interface (ONFI).

The FTL 234 may perform various functions, such as an address mapping operation, a wear-leveling operation, and a garbage collection operation. The address mapping operation may be an operation of converting a logical address received from the host 120 into a physical address used to actually store data in the NVM 224. The wear-leveling operation may be a technique for reducing or preventing excessive deterioration of a specific block by allowing blocks of the NVM 224 to be uniformly used. As an example, the wear-leveling operation may be implemented using a firmware technique that balances erase counts of physical blocks. The garbage collection operation may be a technique for ensuring usable capacity in the NVM 224 by erasing an existing block after copying valid data of the existing block to a new block.

The packet manager 235 may generate a packet according to a protocol of an interface, which consents to the host 120, or parse various types of information from the packet received from the host 120. In addition, the buffer memory 236 may include a write buffer WB that temporarily stores write data to be written to the NVM 224, a read buffer RB that temporarily stores read data read from the NVM 224, and an internal buffer for an internal operation. Although the buffer memory 236 may be a component included in the storage controller 223, the buffer memory 236 may be outside the storage controller 223.

The ECC engine 237 may perform error detection and correction operations on read data read from the NVM 224. For example, the ECC engine 237 may generate parity bits for write data to be written to the NVM 224, and the generated parity bits may be stored in the NVM 224 together with write data. During the reading of data from the NVM 224, the ECC engine 237 may correct an error in the read data by using the parity bits read from the NVM 224 along with the read data, and output error-corrected read data.

The AES engine 238 may perform at least one of an encryption operation and/or a decryption operation on data input to the storage controller 223 by using a symmetric-key algorithm.

Figure 14:
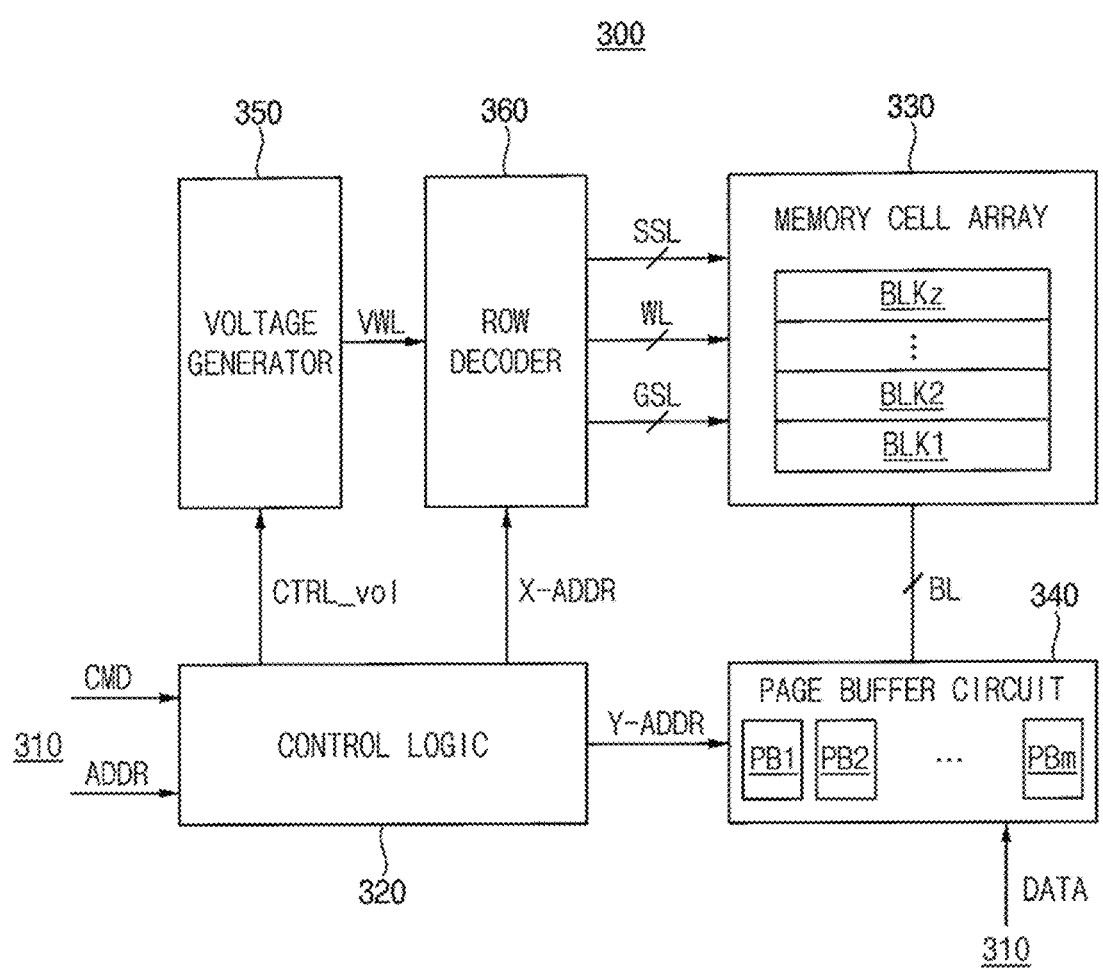
FIG. 14 is a block diagram illustrating an example of a nonvolatile memory device included in a storage device according to some example embodiments.

FIG. 14 is a block diagram illustrating an example of a nonvolatile memory device included in a storage device according to some example embodiments.

Referring to FIG. 14, a nonvolatile memory device 300 may include a memory cell array 330, and a control circuit that performs an operation for the memory cell array 330. The control circuit may include a control logic circuitry 320, a page buffer circuit 340, a voltage generator 350 and a row decoder 360. Although not shown in FIG. 14, the nonvolatile memory device 300 may further include an interface circuitry 310. In addition, the nonvolatile memory device 300 may further include column logic, a pre-decoder, a temperature sensor, a command decoder, and/or an address decoder.

The control logic circuitry 320 may control all various operations of the nonvolatile memory device 300. The control logic circuitry 320 may output various control signals in response to commands CMD and/or addresses ADDR from the interface circuitry 310. For example, the control logic circuitry 320 may output a voltage control signal CTRL_vol, a row address X-ADDR, and a column address Y-ADDR.

The memory cell array 330 may include a plurality of memory blocks BLK1 to BLKz (here, z is a positive integer), each of which may include a plurality of memory cells. The memory cell array 330 may be connected to the page buffer circuit 340 through bitlines BL and be connected to the row decoder 360 through wordlines WL, string selection lines SSL, and ground selection lines GSL.

In some example embodiments, the memory cell array 330 may include a 3D memory cell array, which includes a plurality of NAND strings. Each of the NAND strings may include memory cells respectively connected to wordlines vertically stacked on a substrate. The inventive concepts of U.S. Pat. Nos. 7,679,133; 8,553,466; 8,654,587; 8,559,235; and US Pat. Pub. No. 2011/0233648 are hereby incorporated by reference. In some example embodiments, the memory cell array 330 may include a 2D memory cell array, which includes a plurality of NAND strings arranged in a row direction and a column direction.

The page buffer circuit 340 may include a plurality of page buffers PB1 to PBm (here, m is an integer greater than or equal to 3), which may be respectively connected to the memory cells through a plurality of bitlines BL. The page buffer circuit 340 may select at least one of the bitlines BL in response to the column address Y-ADDR. The page buffer circuit 340 may operate as a write driver or a sense amplifier according to an operation mode. For example, during a program operation, the page buffer circuit 340 may apply a bitline voltage corresponding to data to be programmed, to the selected bitline. During a read operation, the page buffer circuit 340 may sense current or a voltage of the selected bitline BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and an erase voltage as a wordline voltage VWL.

The row decoder 360 may select one of a plurality of wordlines WL and select one of a plurality of string selection lines SSL in response to the row address X-ADDR. For example, the row decoder 360 may apply the program voltage and the program verification voltage to the selected wordline WL during a program operation and apply the read voltage to the selected word line WL during a read operation.

Figure 15:
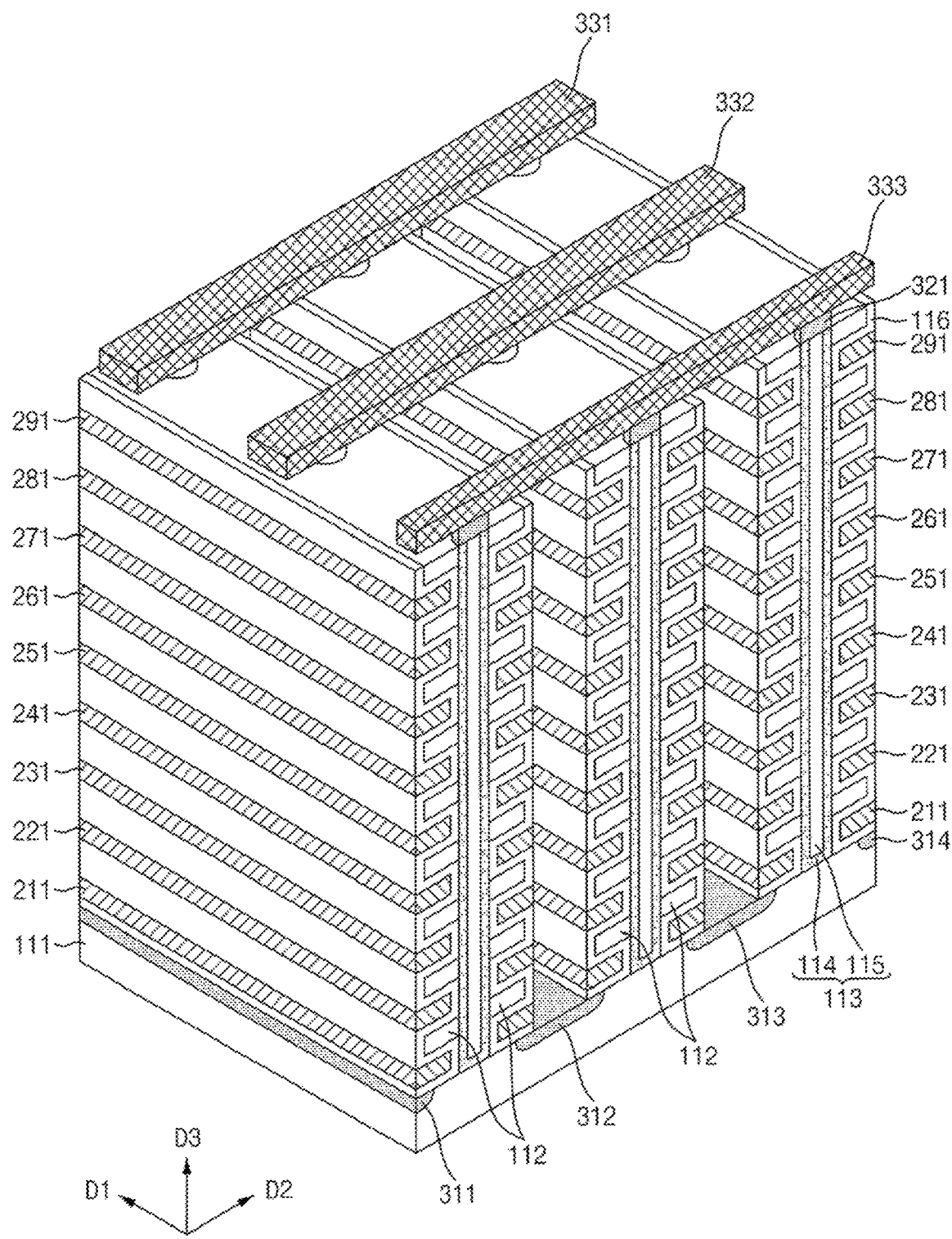
FIG. 15 is a perspective view illustrating an example of a memory block included in a memory cell array of a nonvolatile memory device of FIG. 14 according to some example embodiments.

FIG. 15 is a perspective view illustrating an example of a memory block included in a memory cell array of a nonvolatile memory device of FIG. 14 according to some example embodiments.

Referring to FIG. 15, a memory block BLKi includes a plurality of cell strings (e.g., a plurality of vertical NAND strings) which are formed on a substrate in a three-dimensional structure (or a vertical structure). The memory block BLKi includes structures extending along first, second and third directions D1, D2 and D3.

A substrate 111 is provided. For example, the substrate 111 may have a well of a first type of charge carrier impurity (e.g., a first conductivity type) therein. For example, the substrate 111 may have a p-well formed by implanting a group 3 element such as boron (B). In particular, the substrate 111 may have a pocket p-well provided within an n-well. In some example embodiments, the substrate 111 has a p-type well (or a p-type pocket well). However, the conductivity type of the substrate 111 is not limited to p-type.

A plurality of doping regions 311, 312, 313 and 314 arranged along the second direction D2 are provided in/on the substrate 111. This plurality of doping regions 311 to 314 may have a second type of charge carrier impurity (e.g., a second conductivity type) different from the first type of the substrate 111. In some example embodiments of the inventive concepts, the first to fourth doping regions 311 to 314 may have n-type. However, the conductivity type of the first to fourth doping regions 311 to 314 is not limited to n-type.

A plurality of insulation materials 112 extending along the first direction D1 are sequentially provided along the third direction D3 on a region of the substrate 111 between the first and second doping regions 311 and 312. For example, the plurality of insulation materials 112 are provided along the third direction D3, being spaced by a specific distance. For example, the insulation materials 112 may include or may be formed of an insulation material such as an oxide layer.

A plurality of pillars 113 penetrating the insulation materials along the third direction D3 are sequentially disposed along the first direction D1 on a region of the substrate 111 between the first and second doping regions 311 and 312. For example, the plurality of pillars 113 penetrates the insulation materials 112 to contact the substrate 111.

In some example embodiments, each pillar 113 may include a plurality of materials. For example, a channel layer 114 of each pillar 113 may include or may be formed of a silicon material having a first conductivity type. For example, the channel layer 114 of each pillar 113 may include or may be formed of a silicon material having the same conductivity type as the substrate 111. In some example embodiments of the inventive concepts, the channel layer 114 of each pillar 113 includes or is formed of p-type silicon. However, the channel layer 114 of each pillar 113 is not limited to the p-type silicon.

An internal material 115 of each pillar 113 includes an insulation material. For example, the internal material 115 of each pillar 113 may include or may be formed of an insulation material such as a silicon oxide. In some examples, the internal material 115 of each pillar 113 may include an air gap. The term "air" as discussed herein, may refer to atmospheric air, or other gases that may be present during the manufacturing process.

An insulation layer 116 is provided along the exposed surfaces of the insulation materials 112, the pillars 113, and the substrate 111, on a region between the first and second doping regions 311 and 312. For example, the insulation layer 116 provided on surfaces of the insulation material 112 may be interposed between pillars 113 and a plurality of stacked first conductive materials 211, 221, 231, 241, 251, 261, 271, 281 and 291, as illustrated. In some examples, the insulation layer 116 need not be provided between the first conductive materials 211 to 291 corresponding to ground selection lines GSL (e.g., 211) and string selection lines SSL (e.g., 291). For example, the ground selection lines GSL are the lowermost ones of the stack of first conductive materials 211 to 291 and the string selection lines SSL are the uppermost ones of the stack of first conductive materials 211 to 291.

The plurality of first conductive materials 211 to 291 are provided on surfaces of the insulation layer 116, in a region between the first and second doping regions 311 and 312. For example, the first conductive material 211 extending along the first direction D1 is provided between the insulation material 112 adjacent to the substrate 111 and the substrate 111. In more detail, the first conductive material 211 extending along the first direction D1 is provided between the insulation layer 116 at the bottom of the insulation material 112 adjacent to the substrate 111 and the substrate 111.

A first conductive material extending along the first direction D1 is provided between the insulation layer 116 at the top of the specific insulation material among the insulation materials 112 and the insulation layer 116 at the bottom of a specific insulation material among the insulation materials 112. For example, a plurality of first conductive materials 221 to 281 extending along the first direction D1 are provided between the insulation materials 112 and it may be understood that the insulation layer 116 is provided between the insulation materials 112 and the first conductive materials 221 to 281. The first conductive materials 211 to 291 may be formed of a conductive metal, but in some example embodiments of the inventive concepts the first conductive materials 211 to 291 may include or may be formed of a conductive material such as a polysilicon.

The same structures as those on the first and second doping regions 311 and 312 may be provided in a region between the second and third doping regions 312 and 313. In the region between the second and third doping regions 312 and 313, a plurality of insulation materials 112 are provided, which extend along the first direction D1. A plurality of pillars 113 is provided that are disposed sequentially along the first direction D1 and penetrate the plurality of insulation materials 112 along the third direction D3. An insulation layer 116 is provided on the exposed surfaces of the plurality of insulation materials 112 and the plurality of pillars 113, and a plurality of first conductive materials 211 to 291 extend along the first direction D1. Similarly, the same structures as those on the first and second doping regions 311 and 312 may be provided in a region between the third and fourth doping regions 313 and 314.

A plurality of drain regions 321 are provided on the plurality of pillars 113, respectively. The drain regions 321 may include or may be formed of silicon materials doped with a second type of charge carrier impurity. For example, the drain regions 321 may include or may be formed of silicon materials doped with an n-type dopant. In some example embodiments of the inventive concepts, the drain regions 321 include or are formed of n-type silicon materials. However, the drain regions 321 are not limited to n-type silicon materials.

On the drain regions, a plurality of second conductive materials 331, 332 and 333 are provided, which extend along the second direction D2. The second conductive materials 331 to 333 are disposed along the first direction D1, being spaced apart from each other by a specific distance. The second conductive materials 331 to 333 are respectively connected to the drain regions 321 in a corresponding region. The drain regions 321 and the second conductive material 333 extending along the second direction D2 may be connected through each contact plug. Each contact plug may be, for example, a conductive plug formed of a conductive material such as a metal. The second conductive materials 331 to 333 may include or may be formed of metal materials. The second conductive materials 331 to 333 may include or may be formed of conductive materials such as a polysilicon.

In the example of FIG. 15, the first conductive materials 211 to 291 may be used to form the wordlines WL, the string selection lines SSL and the ground selection lines GSL. For example, the first conductive materials 221 to 281 may be used to form the wordlines WL, where conductive materials belonging to the same layer may be interconnected. The second conductive materials 331 to 333 may be used to form the bitlines BL. The number of layers of the first conductive materials 211 to 291 may be changed variously according to process and control techniques.

Figure 16:
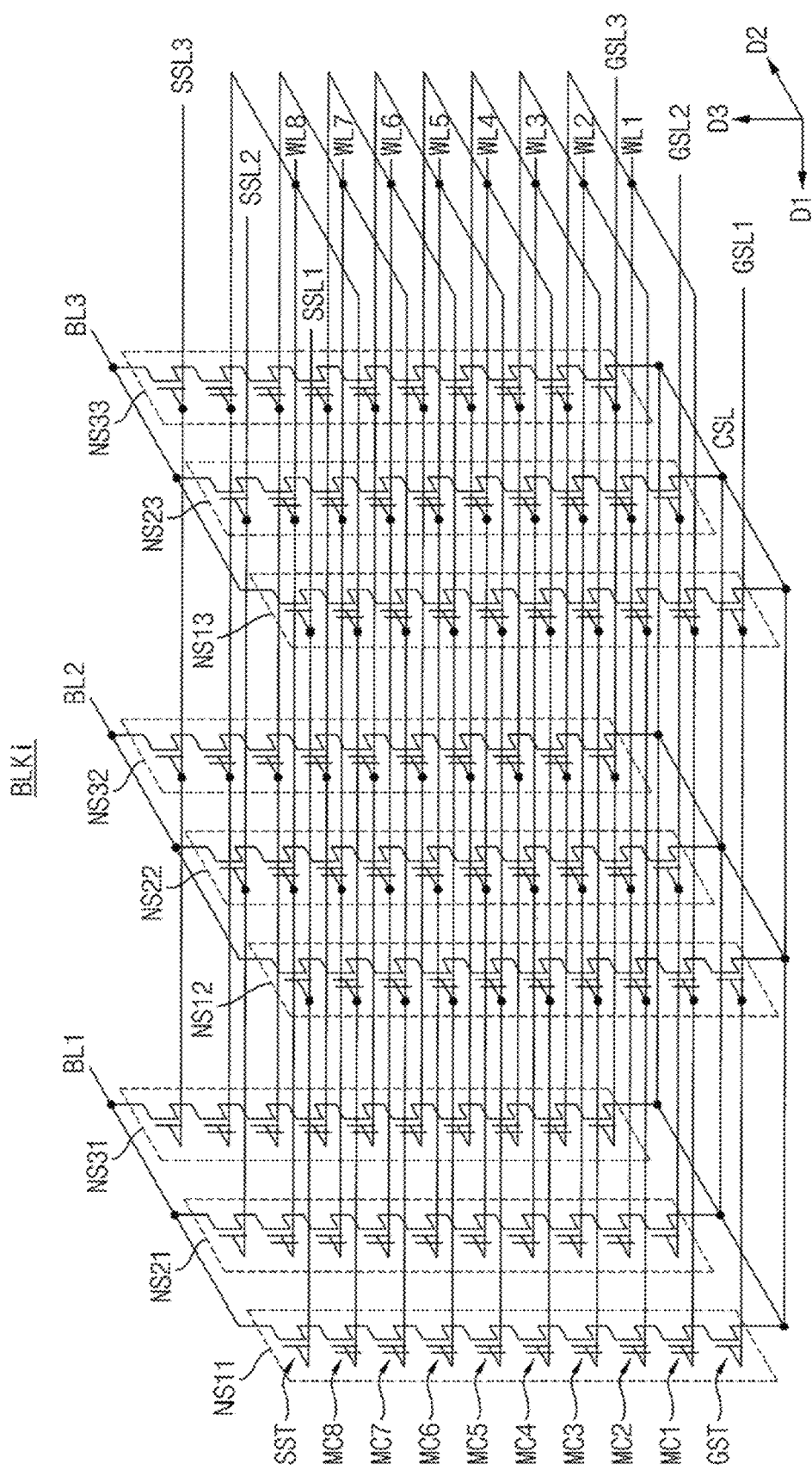
FIG. 16 is a circuit diagram illustrating an equivalent circuit of a memory block described with reference to FIG. 15 according to some example embodiments.

FIG. 16 is a circuit diagram illustrating an equivalent circuit of a memory block described with reference to FIG. 15 according to some example embodiments.

A memory block BLKi shown in FIG. 16 may refer to a 3D memory block having a 3D structure formed on a substrate. For example, a plurality of memory NAND strings included in the memory block BLKi may be formed in a vertical direction to the substrate.

Referring to FIG. 16, the memory block BLKi may include a plurality of memory NAND strings (e.g., NS11 to NS33), which are connected between bitlines BL1, BL2, and BL3 and a common source line CSL. Each of the memory NAND strings NS11 to NS33 may include a string selection transistor SST, a plurality of memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 15, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and/or GTL8. The gate lines GTL1, GTL2, . . . , and GTL8 may respectively correspond to wordlines, and some of the gate lines GTL1, GTL2, . . . , and GTL8 may correspond to dummy wordlines. The ground selection transistor GST may be connected to ground selection lines GSL1, GSL2, and GSL3 corresponding thereto. The string selection transistor SST may be connected to the bitlines BL1, BL2, and BL3 corresponding thereto, and the ground selection transistor GST may be connected to the common source line CSL.

Wordlines (e.g., WL1) at the same level may be connected in common, and the ground selection lines GSL1, GSL2, and GSL3 and the string selection lines SSL1, SSL2, and SSL3 may be separated from each other. FIG. 16 illustrates example embodiments in which a memory block BLKi is connected to eight gate lines GTL1, GTL2, . . . , and GTL8 and three bitlines BL1, BL2, and BL3, without being limited thereto.

The number of the wordlines WL1 to WL8, the number of the bitlines BL1 to BL3, and the number of memory cells MC1 to MC8 are limited to an example of FIG. 16.

Figure 17:
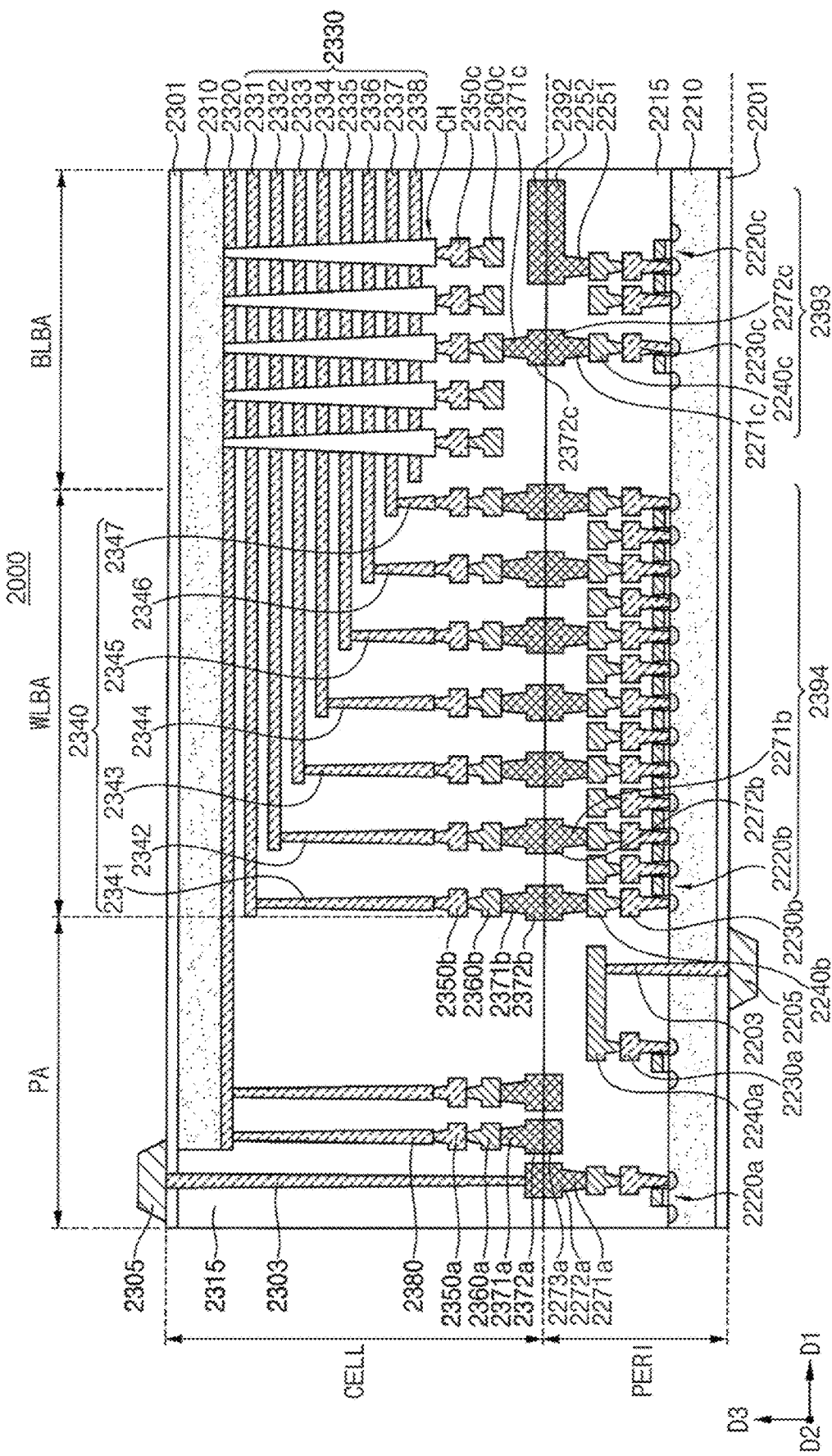
FIG. 17 is a cross-sectional view of a nonvolatile memory device included in a storage device according to some example embodiments.

FIG. 17 is a cross-sectional view of a nonvolatile memory device included in a storage device according to some example embodiments.

Referring to FIG. 17, a nonvolatile memory device 2000 may have a chip-to-chip (C2C) structure. The C2C structure may refer to a structure formed by manufacturing an upper chip including a memory cell region or a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiments, however, may not be limited thereto. For example, the bonding metals may also be formed of aluminum (Al) or tungsten (W).

Each of the peripheral circuit region PERI and the cell region CELL of the nonvolatile memory device 2000 may include an external pad bonding area PA, a wordline bonding area WLBA, and a bitline bonding area BLBA.

The peripheral circuit region PERI may include a first substrate 2210, an interlayer insulating layer 2215, a plurality of circuit elements 2220a, 2220b, and 2220c formed on the first substrate 2210, first metal layers 2230a, 2230b, and 2230c respectively connected to the plurality of circuit elements 2220a, 2220b, and 2220c, and second metal layers 2240a, 2240b, and 2240c formed on the first metal layers 2230a, 2230b, and 2230c. In some example embodiments, the first metal layers 2230a, 2230b, and 2230c may be formed of tungsten having relatively high electrical resistivity, and the second metal layers 2240a, 2240b, and 2240c may be formed of copper having relatively low electrical resistivity.

In example embodiments illustrated in FIG. 17, although only the first metal layers 2230a, 2230b, and 2230c and the second metal layers 2240a, 2240b, and 2240c are shown and described, the example embodiments are not limited thereto, and one or more additional metal layers may be further formed on the second metal layers 2240a, 2240b, and 2240c. At least a portion of the one or more additional metal layers formed on the second metal layers 2240a, 2240b, and 2240c may be formed of aluminum or the like having a lower electrical resistivity than those of copper forming the second metal layers 2240a, 2240b, and 2240c.

The interlayer insulating layer 2215 may be disposed on the first substrate 2210 and cover the plurality of circuit elements 2220a, 2220b, and 2220c, the first metal layers 2230a, 2230b, and 2230c, and the second metal layers 2240a, 2240b, and 2240c. The interlayer insulating layer 2215 may include an insulating material such as silicon oxide, silicon nitride, or the like.

Lower bonding metals 2271b and 2272b may be formed on the second metal layer 2240b in the wordline bonding area WLBA. In the wordline bonding area WLBA, the lower bonding metals 2271b and 2272b in the peripheral circuit region PERI may be electrically bonded to upper bonding metals 2371b and 2372b of the cell region CELL. The lower bonding metals 2271b and 2272b and the upper bonding metals 2371b and 2372b may be formed of aluminum, copper, tungsten, or the like. Further, the upper bonding metals 2371b and 2372b in the cell region CELL may be referred as first metal pads and the lower bonding metals 2271b and 2272b in the peripheral circuit region PERI may be referred as second metal pads.

The cell region CELL may include at least one memory block. The cell region CELL may include a second substrate 2310 and a common source line 2320. On the second substrate 2310, a plurality of wordlines 2331 to 2338 (e.g., 2330) may be stacked in a third direction D3 (e.g., a Z-axis direction), perpendicular to an upper surface of the second substrate 2310. At least one string selection line and at least one ground selection line may be arranged on and below the plurality of wordlines 2330, respectively, and the plurality of wordlines 2330 may be disposed between the at least one string selection line and the at least one ground selection line.

In the bitline bonding area BLBA, a channel structure CH may extend in the third direction D3 (e.g., the Z-axis direction), perpendicular to the upper surface of the second substrate 2310, and pass through the plurality of wordlines 2330, the at least one string selection line, and the at least one ground selection line. The channel structure CH may include a data storage layer, a channel layer, a buried insulating layer, and the like, and the channel layer may be electrically connected to a first metal layer 2350c and a second metal layer 2360c. For example, the first metal layer 2350c may be a bitline contact, and the second metal layer 2360c may be a bitline. In some example embodiments, the bitline 2360c may extend in a second direction D2 (e.g., a Y-axis direction), parallel to the upper surface of the second substrate 2310.

In example embodiments illustrated in FIG. 17, an area in which the channel structure CH, the bitline 2360c, and the like are disposed may be defined as the bitline bonding area BLBA. In the bitline bonding area BLBA, the bitline 2360c may be electrically connected to the circuit elements 2220c providing a page buffer 2393 in the peripheral circuit region PERI. The bitline 2360c may be connected to upper bonding metals 2371c and 2372c in the cell region CELL, and the upper bonding metals 2371c and 2372c may be connected to lower bonding metals 2271c and 2272c connected to the circuit elements 2220c of the page buffer 2393.

In the wordline bonding area WLBA, the plurality of wordlines 2330 may extend in a first direction D1 (e.g., an X-axis direction), parallel to the upper surface of the second substrate 2310 and perpendicular to the second direction D2, and may be connected to a plurality of cell contact plugs 2341 to 2347 (e.g., 2340). The plurality of wordlines 2330 and the plurality of cell contact plugs 2340 may be connected to each other in pads provided by at least a portion of the plurality of wordlines 2330 extending in different lengths in the first direction D1. A first metal layer 2350b and a second metal layer 2360b may be connected to an upper portion of the plurality of cell contact plugs 2340 connected to the plurality of wordlines 2330, sequentially. The plurality of cell contact plugs 2340 may be connected to the peripheral circuit region PERI by the upper bonding metals 2371*b* and 2372*b* of the cell region CELL and the lower bonding metals 2271*b* and 2272*b* of the peripheral circuit region PERI in the wordline bonding area WLBA. In some example embodiments, bonding metals 2251 and 2252 of the peripheral circuit area PERI may be connected to the cell area CELL through the bonding metal 2392 of the cell area CELL The plurality of cell contact plugs 2340 may be electrically connected to the circuit elements 2220*b* forming a row decoder 2394 in the peripheral circuit region PERI. In some example embodiments, operating voltages of the circuit elements 2220*b* forming the row decoder 2394 may be different than operating voltages of the circuit elements 2220*c* forming the page buffer 2393. For example, operating voltages of the circuit elements 2220*c* forming the page buffer 2393 may be greater than operating voltages of the circuit elements 2220*b* forming the row decoder 2394.

A common source line contact plug 2380 may be disposed in the external pad bonding area PA. The common source line contact plug 2380 may be formed of a conductive material such as a metal, a metal compound, polysilicon, or the like, and may be electrically connected to the common source line 2320. A first metal layer 2350*a* and a second metal layer 2360*a* may be stacked on an upper portion of the common source line contact plug 2380, sequentially. For example, an area in which the common source line contact plug 2380, the first metal layer 2350*a*, and the second metal layer 2360*a* are disposed may be defined as the external pad bonding area PA. The second metal layer 2360*a* may be electrically connected to the upper metal via 2371*a*. The upper metal via 2371*a* may be electrically connected to the upper metal pattern 2372*a*.

Input/output pads 2205 and 2305 may be disposed in the external pad bonding area PA. A lower insulating film 2201 covering a lower surface of the first substrate 2210 may be formed below the first substrate 2210, and a first input/output pad 2205 may be formed on the lower insulating film 2201. The first input/output pad 2205 may be connected to at least one of the plurality of circuit elements 2220*a*, 2220*b*, and/or 2220*c* disposed in the peripheral circuit region PERI through a first input/output contact plug 2203, and may be separated from the first substrate 2210 by the lower insulating film 2201. In addition, a side insulating film may be disposed between the first input/output contact plug 2203 and the first substrate 2210 to electrically separate the first input/output contact plug 2203 and the first substrate 2210.

An upper insulating film 2301 covering the upper surface of the second substrate 2310 may be formed on the second substrate 2310, and a second input/output pad 2305 may be disposed on the upper insulating film 2301. The second input/output pad 2305 may be connected to at least one of the plurality of circuit elements 2220*a*, 2220*b*, and/or 2220*c* disposed in the peripheral circuit region PERI through a second input/output contact plug 2303. In some example embodiments, the second input/output pad 2305 is electrically connected to a circuit element 2220*a* disposed in the peripheral circuit area PERI through the second input and output contact plug 2303, the lower metal pattern 2272*a*, and the lower metal via 2271*a*.

According to some example embodiments, the second substrate 2310 and the common source line 2320 may not be disposed in an area in which the second input/output contact plug 2303 is disposed. Also, the second input/output pad 2305 may not overlap the wordlines 2330 in the third direction D3 (e.g., the Z-axis direction). The second input/output contact plug 2303 may be separated from the second substrate 2310 in the direction, parallel to the upper surface of the second substrate 2310, and may pass through the interlayer insulating layer 2315 of the cell region CELL to be connected to the second input/output pad 2305.

According to some example embodiments, the first input/output pad 2205 and the second input/output pad 2305 may be selectively formed. For example, the nonvolatile memory device 2000 may include only the first input/output pad 2205 disposed on the first substrate 2210 or the second input/output pad 2305 disposed on the second substrate 2310. In some example embodiments, the nonvolatile memory device 2000 may include both the first input/output pad 2205 and the second input/output pad 2305.

A metal pattern provided on an uppermost metal layer may be provided as a dummy pattern or the uppermost metal layer may be absent, in each of the external pad bonding area PA and the bitline bonding area BLBA, respectively included in the cell region CELL and the peripheral circuit region PERI.

In the external pad bonding area PA, the nonvolatile memory device 2000 may include a lower metal pattern 2273*a*, corresponding to an upper metal pattern 2372*a* formed in an uppermost metal layer of the cell region CELL, and having the same cross-sectional shape as the upper metal pattern 2372*a* of the cell region CELL so as to be connected to each other, in an uppermost metal layer of the peripheral circuit region PERI. In the peripheral circuit region PERI, the lower metal pattern 2273*a* formed in the uppermost metal layer of the peripheral circuit region PERI may not be connected to a contact. Similarly, in the external pad bonding area PA, an upper metal pattern 2372*a*, corresponding to the lower metal pattern 2273*a* formed in an uppermost metal layer of the peripheral circuit region PERI, and having the same shape as a lower metal pattern 2273*a* of the peripheral circuit region PERI, may be formed in an uppermost metal layer of the cell region CELL.

The lower bonding metals 2271*b* and 2272*b* may be formed on the second metal layer 2240*b* in the wordline bonding area WLBA. In the wordline bonding area WLBA, the lower bonding metals 2271*b* and 2272*b* of the peripheral circuit region PERI may be electrically connected to the upper bonding metals 2371*b* and 2372*b* of the cell region CELL by a Cu-to-Cu bonding.

Further, in the bitline bonding area BLBA, an upper metal pattern 2392, corresponding to a lower metal pattern 2252 formed in the uppermost metal layer of the peripheral circuit region PERI, and having the same cross-sectional shape as the lower metal pattern 2252 of the peripheral circuit region PERI, may be formed in an uppermost metal layer of the cell region CELL. A contact may not be formed on the upper metal pattern 2392 formed in the uppermost metal layer of the cell region CELL.

In some example embodiments, corresponding to a metal pattern formed in an uppermost metal layer in one of the cell region CELL and/or the peripheral circuit region PERI, a reinforcement metal pattern having the same cross-sectional shape as the metal pattern may be formed in an uppermost metal layer in the other one of the cell region CELL and/or the peripheral circuit region PERI. A contact may not be formed on the reinforcement metal pattern.

The inventive concepts may be applied to various storage systems and computing systems including the storage systems. For example, the inventive concepts may be applied to systems such as a PC, a server computer, a data center, a workstation, a mobile phone, a smart phone, a tablet computer, a laptop computer, a PDA, a PMP, a digital camera, a portable game console, a music player, a camcorder, a video player, a navigation device, a wearable device, an IoT device, an IoE device, an e-book reader, a VR device, an AR device, a robotic device, a drone, etc.

As described herein, any devices, systems, blocks, modules, units, controllers, circuits, apparatus, and/or portions thereof according to any of some example embodiments (including, without limitation, any of the example embodiments of the computing system 100, host 120, host processor 140, host memory 160, storage system 200, storage device 220, storage device 240, storage device 260, write buffer 222, write buffer 242, first storage device 220a, host 120a, hypervisor 130a, storage device 220a, nonvolatile memory device 224a, first write buffer 222a, storage device 240a, nonvolatile memory device 244a, write buffer 242a, storage device 260a, storage device 220b, nonvolatile memory device 224b, first write buffer 222b, read buffer 228b, storage device 240b, nonvolatile memory device 244b, write buffer 242b, read buffer 248b, storage device 220c, nonvolatile memory device 244c, write buffer 242c, read buffer 248c, storage controller 223, host interface 230, CPU 233, FTL 234, packet manager 235, memory interface 232, AES engine 238, ECC engine 237, buffer memory 236, nonvolatile memory device 224, nonvolatille memory device 300, control logic circuitry 320, page buffer circuit 340, voltage generator 350, row decoder 360, memory cell array 330, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, blocks, modules, units, controllers, circuits, apparatuses, and/or portions thereof according to any of some example embodiments, and/or any portions thereof, including for example some or all operations of any of the methods and/or processes shown in any of the drawings.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as some example embodiments, are intended to be included within the scope of the appended claims.

What is claimed is:

1. A storage system comprising:
a first storage device including a first write buffer and a first nonvolatile memory device; and
a second storage device including a second write buffer and a second nonvolatile memory device,
wherein the first storage device is configured to, in response to a determination that a use buffer size of the first write buffer is greater than a first reference buffer size when the first storage device receives write data from a host, transfer the write data to the second storage device, and the second storage device is configured to store the write data,
wherein the second storage device is configured to, in response to a determination that the second storage device receives the write data from the first storage device,
store the write data in the second write buffer, and
write the write data stored in the second write buffer to a memory block of the second nonvolatile memory device, and
wherein
the first storage device further includes a mapping table,
the second storage device is configured to transfer a logical address corresponding to an address of the memory block of the second nonvolatile memory device to the first storage device, and
the first storage device is configured to change a physical address for the write data in the mapping table to the logical address received from the second storage device.

2. The storage system of claim 1, wherein the first storage device is configured to directly transfer the write data to the second storage device through peer-to-peer (P2P) communication.

3. The storage system of claim 1, wherein the first storage device is configured to, in response to a determination that the use buffer size of the first write buffer is decreased to less than a second reference buffer size,
receive the write data from the second storage device,
store the write data in the first write buffer, and
write the write data stored in the first write buffer to the first nonvolatile memory device.

4. The storage system of claim 3, wherein the second storage device is configured to directly transfer the write data to the first storage device through P2P communication.

5. The storage system of claim 1, wherein
the first storage device further includes a first read buffer, and
the first storage device is configured to, in response to a determination that the first storage device receives a read command for the write data from the host concurrently with the write data being stored in the second storage device,
receive the write data from the second storage device,
store the write data in the first read buffer, and
output the write data stored in the first read buffer to the host.

6. The storage system of claim 1, wherein the first storage device is configured to check a remaining buffer size of the second write buffer of the second storage device prior to transferring the write data to the second storage device.

7. The storage system of claim 6, wherein
the first storage device is configured to transfer a buffer status request signal to the second storage device, and the second storage device is configured to transfer a buffer status response including the remaining buffer size of the second write buffer to the first storage device in response to the buffer status request signal.

8. The storage system of claim 7, wherein the buffer status response further includes information indicating a total buffer size of the second write buffer and information indicating whether the second write buffer is permitted to be used.

9. The storage system of claim 1, further comprising:
at least one third storage device including a third write buffer,
wherein the first storage device is configured to broadcast a buffer status request signal to the second storage device and the at least one third storage device through an interface bus, and
wherein the second storage device and the at least one third storage device are configured to transfer buffer status responses for the second write buffer and the third write buffer through the interface bus in response to the buffer status request signal, respectively.

10. The storage system of claim 1, wherein
the second storage device further includes a first read buffer,
the first storage device is configured to request the write data to the second storage device with the logical address, and
the second storage device is configured to
store the write data in the first read buffer based on reading the write data from the memory block of the second nonvolatile memory device based on the address of the memory block of the second nonvolatile memory device corresponding to the logical address, and
transfer the write data stored in the first read buffer to the first storage device.

11. A storage system, comprising:
a first storage device including a first write buffer and a first nonvolatile memory device; and
a second storage device including a second write buffer and a second nonvolatile memory device,
wherein the first storage device is configured to, in response to a determination that a use buffer size of the first write buffer is greater than a first reference buffer size when the first storage device receives write data from a host, transfer the write data to the second storage device, and the second storage device is configured to store the write data,
wherein the second nonvolatile memory device includes a normal region that is accessible by the host, and an over-provisioning region that is not accessible by the host, and
wherein the second storage device is configured to, in response to a determination that the second storage device receives the write data from the first storage device,
store the write data in the second write buffer, and
write the write data stored in the second write buffer to a memory block within the over-provisioning region.

12. The storage system of claim 11, wherein
the first storage device includes a mapping table,
the second storage device is configured to generate a logical address corresponding to an address of the memory block within the over-provisioning region, and transfer the logical address to the first storage device, and
the first storage device is configured to change a physical address for the write data in the mapping table to the logical address received from the second storage device.

13. The storage system of claim 12, wherein
the second storage device further includes a first read buffer,
the first storage device is configured to request the write data to the second storage device with the logical address, and
the second storage device is configured to
store the write data in the first read buffer based on reading the write data from the memory block within the over-provisioning region based on the address of the memory block within the over-provisioning region corresponding to the logical address, and
transfer the write data stored in the first read buffer to the first storage device.

14. A computing system, comprising:
a storage system; and
a host configured to store data in the storage system,
wherein the storage system includes:
a first storage device including a first write buffer and a first nonvolatile memory device; and
a second storage device including a second write buffer and a second nonvolatile memory device,
wherein the first storage device is configured to, in response to a determination that a use buffer size of the first write buffer is greater than a first reference buffer size when the first storage device receives write data from the host, transfer the write data to the second storage device, and the second storage device is configured to store the write data,
wherein the second storage device is configured to, in response to a determination that the second storage device receives the write data from the first storage device,
store the write data in the second write buffer, and
write the write data stored in the second write buffer to a memory block of the second nonvolatile memory device, and
wherein
the first storage device further includes a mapping table,
the second storage device is configured to transfer a logical address corresponding to an address of the memory block of the second nonvolatile memory device to the first storage device, and
the first storage device is configured to change a physical address for the write data in the mapping table to the logical address received from the second storage device.

* * * * *